United States Patent [19]

Naito

[11] Patent Number: 5,481,390

[45] Date of Patent: Jan. 2, 1996

[54] OPTICAL AMPLIFIER REPEATER

[75] Inventor: Takao Naito, Kawasaki, Japan

[73] Assignee: Fujitsu Limited, Kanagawa, Japan

[21] Appl. No.: 385,146

[22] Filed: Feb. 7, 1995

[30] Foreign Application Priority Data

Feb. 25, 1994 [JP] Japan .................................. 6-028414

[51] Int. Cl.⁶ .............................. H04B 10/02; H04B 3/00
[52] U.S. Cl. ...................... 359/174; 359/179; 359/110; 359/177; 359/333; 385/15
[58] Field of Search ..................... 359/174, 175, 359/176, 177, 178, 179, 166, 172, 110, 333, 347; 385/20, 24, 15

[56] References Cited

U.S. PATENT DOCUMENTS 5,296,957 3/1994 Takahashi et al. .................. 359/174
5,315,674 5/1994 Asako .................................. 359/174

FOREIGN PATENT DOCUMENTS 2268017 12/1993 United Kingdom .

*Primary Examiner*—Leo Boudreau
*Assistant Examiner*—Bhavesh Mehta

[57] ABSTRACT

Signal light from a terminal equipment is inputted from an input side of an ascending line, amplified by an ascending optical amplifier and sent to an output side of the ascending line by way of a first optical coupler and a second optical coupler. In the first optical coupler, part of the signal light is branched and introduced to an output side of a descending line by way of an optical transmission line and a third optical coupler. The signal light thus branched is measured and analyzed by the terminal equipment to effect detection of presence or absence of occurrence of a trouble and specification of a trouble location. This also applies to the descent. Since optical transmission paths in the optical amplifier repeater do not construct any loop, the signal to noise ratio (SNR) deteriorated by circulation noise is improved, and detection of a trouble and specification of a trouble location can be achieved with a higher degree of accuracy.

31 Claims, 15 Drawing Sheets

5,481,390

OPTICAL AMPLIFIER REPEATER

BACKGROUND OF THE INVENTION

1. Field of the Invention

This invention relates to an optical amplifier repeater for use with an optical amplification multi-stage repeating system.

2. Description of the Related Art

In the field of very long haul optical transmission across an ocean over several thousands kilometers, development of an optical amplification multi-stage repeating system which employs a repeating system in which a plurality of optical amplifier repeaters are interposed at a plurality of stages like a chain in an optical transmission line in order to compensate for the loss involved in transmission of signal light is proceeding. An optical amplifier repeater amplifies and outputs signal light inputted thereto as it is, and allows achievement of considerable reduction in cost by reduction in number of parts in each repeater and is expected to achieve improvement in reliability comparing with a conventional a regeneration repeater which performs, after it converts an optical signal inputted thereto into an electric signal, synchronization regeneration (to re-arrange code pulses to correct time positions) and waveform regeneration (to return code pulses into pulses having a correct waveform free from a distortion) and then converts the resulted electric signal back into an optical signal to be outputted. Further, it has an advantage in that it is also possible to increase the transmission rate by improvement in terminal equipments on the opposite sides of it in future.

By the way, in an optical amplification multi-stage repeating system which employs such an optical amplifier repeater as described above, it is necessary to normally supervise the conditions of each optical amplifier repeater and each optical transmission line and, when a trouble occurs, promptly specify and repair a location where the trouble has occurred. Accordingly, it is demanded to provide an optical amplifier repeater which can achieve an increase in reliability in detection of occurrence of a trouble and specification of the trouble occurrence location and allow realization of stabilized communication.

A construction of an optical amplification multi-stage repeating system is shown in FIG. 13. The optical amplification multi-stage repeating system is constructed such that, as shown in FIG. 13, a downstream side terminal equipment 1 and an upstream side terminal equipment 2 are connected to each other by an ascending line 4 and a descending line 5 each formed from an optical fiber by way of a plurality of optical amplifier repeaters 3. Supervision of the condition of the ascending line 4 is performed by introducing part of signal light sent from the downstream side terminal equipment 1 using the ascending line 4 into the descending line 5 at each of the optical amplifier repeaters 3 and measuring the signal light at the downstream side terminal equipment 1. On the other hand, supervision of the condition of the descending line 5 is performed by introducing part of signal light sent from the upstream side terminal equipment 2 using the descending line 5 into the ascending line 4 at each of the optical amplifier repeaters 3 and measuring the signal light at the upstream side terminal equipment 2. It is to be noted that, in the following description, an optical transmission route for introducing signal light of the ascending line into the descending line or introducing signal light of the descending line into the ascending line will be referred to as loop back path.

Further, detection of a trouble point on an optical transmission line is performed by sending a predetermined optical pulse or the like from the downstream side terminal equipment 1 using the ascending line 4, introducing part of reflected light of the ascending line 4 into the descending line 5 at each of the optical amplifier repeaters 3 and measuring the reflected light at the downstream side terminal equipment 1. Meanwhile, detection of a trouble point of the other transmission line is performed by sending a predetermined optical pulse or the like from the upstream side terminal equipment 2 using the descending line 5, introducing part of reflected light of the descending line 5 into the ascending line 4 at each of the optical amplifier repeaters 3 and measuring the reflected light at the upstream side terminal equipment 2. It is to be noted that, in the following description, an optical transmission route for introducing reflected light of the ascending line into the descending line or introducing reflected light of the descending line into the ascending line will be referred to as return path.

A construction of the conventional optical amplifier repeater having a loop back path described above will be described with reference to FIG. 14. The optical amplifier repeater shown includes an ascending optical amplifier 6A, a descending optical amplifier 6B, a first optical coupler 7 and a second optical coupler 8. Each of the first optical coupler 7 and the second optical coupler 8 is a two-input two-output optical coupler having two input ports and two output ports.

An input side 4A of the ascending line is connected to the input side of the ascending optical amplifier 6A, and a first input port 7A of the first optical coupler 7 is connected to the output side of the ascending optical amplifier 6A. An output side 4B of the ascending line is connected to a first output port 7D of the first optical coupler 7. An input side 5A of the descending line is connected to the input side of the descending optical amplifier 6B, and a first input port 8A of the second optical coupler 8 is connected to the output side of the descending optical amplifier 6B. An output side 5B of the descending line is connected to a first output port 8D of the second optical coupler 8. A second output port 7E of the first optical coupler 7 and a second input port 8B of the second optical coupler 8 are connected to each other by a first optical transmission line 9A, and a second input port 7B of the first optical coupler 7 and a second output port 8E of the second optical coupler 8 are connected to each other by a second optical transmission line 9B.

Thus, signal light sent from the input side 4A of the ascending line is amplified by the ascending optical amplifier 6A and sent to the output side 4B of the ascending line by way of the first input port 7A and the first output port 7D of the first optical coupler 7. Meanwhile, signal light sent from the input side 5A of the descending line is amplified by the descending optical amplifier 6B and sent to the output side 5B of the descending line by way of the first input port 8A and the first output port 8D of the second optical coupler 8. Further, part of signal light inputted to the first optical coupler 7 is outputted from the second output port 7E of the first optical coupler 7 and sent to the output side 5B of the descending line by way of the first optical transmission line 9A and the second input port 8B and the first output port 8D of the second optical coupler 8. Part of signal light inputted to the second optical coupler 8 is outputted from the second output port 8E of the second optical coupler 8 and sent to the output side 4B of the ascending line by way of the second optical transmission line 9B and the second input port 7B and the first output port 7D of the first optical coupler 7. In this manner, an ascending loop back path is constituted from the first optical coupler 7, the first optical transmission line 9A and the second optical coupler 8 while a descending loop back path is constituted from the second optical coupler 8, the second optical transmission line 9B and the first optical coupler 7.

Subsequently, a construction of another conventional optical amplifier repeater having a loop back path and a return path described above will be described with reference to FIG. 15. The optical amplifier repeater shown includes an ascending optical amplifier 10A, a descending optical amplifier 10B, a first optical coupler 11, a second optical coupler 12, a third optical coupler 13 and a fourth optical coupler 14. Each of the first to fourth optical couplers 11, 12, 13 and 14 is a two-input two-output bidirectional optical coupler having two input ports and two output ports.

The input side of the ascending optical amplifier 10A is connected to an input side 4A of an ascending line, and the output side of the ascending optical amplifier 10A is connected to a first input port 11A of the first optical coupler 11. A first output port 11D of the first optical coupler 11 is connected to an output side 4B of the ascending line. The input side of the descending optical amplifier 10B is connected to an input side 5A of a descending line, and the output side of the descending optical amplifier 10B is connected to a first input port 13A of the third optical coupler 13. A first output port 13D of the third optical coupler 13 is connected to an output side 5B of the descending line.

A first input port 12A of the second optical coupler 12 is connected to a second output port 11E of the first optical coupler 11 by way of a first optical transmission line 15A, and a first output port 12D of the second optical coupler 12 is connected to a second input port 13B of the third optical coupler 13 by way of a second optical transmission line 15B. A first input port 14A of the fourth optical coupler 14 is connected to a second output port 13E of the third optical coupler 13 by way of a third optical transmission line 15C, and a first output port 14D of the fourth optical coupler 14 is connected to a second input port 11B of the first optical coupler 11 by way of a fourth optical transmission line 15D. A second input port 14B of the fourth optical coupler 14 is connected to a second input port 12B of the second optical coupler 12 by way of a fifth optical transmission line 15E.

Thus, signal light sent from the input side 4A of the ascending line is amplified by the ascending optical amplifier 10A and sent to the output side 4B of the ascending line by way of the first input port 11A and the first output port 11D of the first optical coupler 11. Part of the signal light inputted to the first optical coupler 11 is outputted from the second output port 11E of the first optical coupler 11 and sent to the output side 5B of the descending line by way of the first optical transmission line 15A, the second optical coupler 12, the second optical transmission line 15B and the third optical coupler 13. By this, a loop back path for the ascending line is constructed. Further, reflected light from the output side 4B of the ascending line is sent to the output side 5B of the descending line by way of the first optical coupler 11, the fourth optical transmission line 15D, the fourth optical coupler 14, the fifth optical transmission line 15E, the second optical coupler 12, the second optical transmission line 15B and the third optical coupler 13. By this, a return path for the ascending line is constructed.

Meanwhile, signal light sent from the input side 5A of the descending line is amplified by the descending optical amplifier 10B and sent to the output side 5B of the descending line by way of the first input port 13A and the first output port 13D of the third optical coupler 13. Part of the signal light inputted to the third optical coupler 13 is outputted from the second output port 13E of the third optical coupler 13 and sent to the output side 4B of the ascending line by way of the third optical transmission line 15C, the fourth optical coupler 14, the fourth optical transmission line 15D and the first optical coupler 11. By this, a loop back path for the descending line is constructed. Further, reflected light from the output side 5B of the descending line is sent to the output side 4B of the ascending line by way of the third optical coupler 13, the second optical transmission line 15B, the second optical coupler 12, the fifth optical transmission line 15E, the fourth optical coupler 14, the fourth optical transmission line 15D and the first optical coupler 11. By this, a return path for the descending line is formed.

Further detailed description of the loop back paths and the return paths in the second conventional optical amplifier repeater described above will be given below. For the convenience of description, the optical transmission lines in the optical amplifier repeater are divided into 16 paths with the directions taken into consideration, and reference characters from a to p are applied to them as shown in FIG. 15. In particular, a normal loop back path of the ascending line is constituted from the paths a-g-i-e. A normal loop back path of the descending line is constituted from the paths d-k-m-b. Further, a normal return path of the ascending line is constituted from the paths c-n-o-i-e. A normal return path of the descending line is constituted from the paths f-j-p-m-b.

Since the maximum transmission distance of an optical amplification multi-stage repeating system ranges over up to several thousands kilometers, it is necessary to accurately detect occurrence of a trouble as well as to specify and rapidly repair a location at which the trouble has occurred with a high degree of accuracy. However, according to the prior art shown in FIG. 14, while, for example, in the ascent, part of signal light sent from the input side 4A of the ascending line by way of the optical amplifier 6A is sent to the output side 5B of the descending line by way of the first optical coupler 7, the first optical transmission line 9A and the second optical coupler 8, since a loop (annular light transmission path) is formed from the first optical coupler 7, the first optical transmission line 9A, the second optical coupler 8 and the second optical transmission line 9B, circulation light which has circulated the loop once, twice or more is superimposed as noise with part of the signal light for supervision of a trouble. The noise (in the specification of the present application, such noise will be referred to as circulation noise) makes a factor to deteriorate the signal to noise ratio (SNR) of signal light, and detection of a trouble cannot be achieved with a high degree of accuracy. It is to be noted that this quite similarly applies to the descent.

Meanwhile, according to the second conventional optical amplifier repeater shown in FIG. 15, the loop back paths have the same problem as the conventional optical amplifier repeater of FIG. 14. In particular, referring to FIG. 15, as an abnormal loop back path of the ascending line, paths a-g-i-k-m-g-i-e are constructed while, as abnormal loop back paths of the descending line, paths d-k-m-g-i-k-m-b are constructed, and the signal to noise ratio is deteriorated by light which circulates in the abnormal loop back paths.

Further, as abnormal return paths of the ascending line, paths c-n-o-i-k-m-g-i-e (hereinafter referred to as first abnormal return path), paths c-n-l-j-p-m-g-i-e (hereinafter referred to as second abnormal return path) and further paths c-n-l-j-h-n-o-i-e (hereinafter referred to as third abnormal return path) are constructed. As abnormal return paths of the descending line, paths f-j-p-m-g-i-k-m-b (hereinafter referred to as first abnormal return path), paths f-j-h-n-o-i- k-m-b (hereinafter referred to as second abnormal return path) and further paths f-j-h-n-l-j-p-m-b (hereinafter referred to as third abnormal return path), and the signal to noise ratio is deteriorated by circulation light which circulates in those abnormal return paths.

In this manner, according to the prior art, there is a problem in that light which circulates between a plurality of optical couplers constituting loop back paths and return paths is superimposed as circulation noise with signal light or reflected light for detection of a trouble and deteriorates the signal to noise ratio (SNR) of the signal light or reflected light, resulting in failure in detection of a trouble with a high degree of accuracy. Further, the conventional optical amplifier repeaters have another problem in that the intensity of signal light is sometimes rendered unstable by a variation in optical loss caused by deterioration of an optical transmission line with respect to time or the like.

SUMMARY OF THE INVENTION

Accordingly, it is an object of the present invention to provide an optical amplifier repeater for an optical amplification multi-stage repeating system which can achieve an increase in accuracy in detection of a trouble.

It is another object of the present invention to provide an optical amplifier repeater which can amplify signal light stably.

In order to solve the subject described above, the following optical amplifier repeaters described below are provided. It is to be noted that optical coupler means in the specification of the present application signifies optical wave splitting means, optical wave combining means or optical combining and splitting means having functions of both of them. Further, in the specification of the present application, an input or output port of optical coupler means is represented in such a manner that a first input port of first optical coupler means is represented as first-first input port, and a second output port of third optical coupler means is represented as third-second output port.

(1) First Construction of the Invention

According to the first construction of the present invention, an optical amplifier repeater comprises first optical amplification means for amplifying signal light transmitted along the ascending line, second optical amplification means for amplifying signal light transmitted along the descending line, first optical coupler means having a first-first input port, a first-first output port and a first-second output port, an input side of the ascending line being connected to the first-first input port by way of the first optical amplification means, second optical coupler means having a second-first input port, a second-second input port and a second-first output port, the first-first output port being connected to the second-first input port, an output side of the ascending line being connected to the second-first output port, third optical coupler means having a third-first input port, a third-first output port and a third-second output port, an input side of the descending line being connected to the third-first input port by way of the second optical amplification means, the second-second input port being connected to the third-second output port, and fourth optical coupler means having a fourth-first input port, a fourth-second input port and a fourth-first output port, the third-first output port being connected to the fourth-first input port, the first-second output port being connected to the fourth-second input port, an output side of the descending line being connected to the fourth-first output port.

Each of the first to fourth optical coupler means has such a directionality that it functions only from an input side to an output side thereof. Where each of the first to fourth optical coupler means has an additional input port or output port, the additional input port or output port is preferably processed by non-reflecting termination processing.

Further, in addition to the construction described above, the optical amplifier repeater may be constructed such that the second optical coupler means further has a second-second output port, and the fourth optical coupler means further has a fourth-second output port, and that it further comprises first light reception means connected to the second-second output port, second light reception means connected to the fourth-second output port, first output fixing control means for controlling a power of output light of the first optical amplification means in response to an intensity of signal light from the first light reception means, and second output fixing control means for controlling a power of output light of the second optical amplification means in response to an intensity of signal light from the second light reception means. In the construction described above, the optical amplifier repeater may be constructed such that the first optical amplification means includes an ion-doped fiber connected to the input side of the ascending line and doped with ions of erbium or a like element, a pumping light source for outputting pumping light of an intensity corresponding to an inrush current thereto, and optical wave combining means for introducing the pumping light to the ion-doped fiber, that the second optical amplification means includes an ion-doped fiber connected to the input side of the descending line, a pumping light source for outputting pumping light of an intensity corresponding to an inrush current thereto, and optical wave combining means for introducing the pumping light to the ion-doped fiber, that the first output fixing control means controls the inrush current to the pumping light source so that the intensity of the signal light at the first light reception means may be fixed, and that the second output fixing control means controls the inrush current to the pumping light source so that the intensity of the signal light at the second light reception means may be fixed.

Further, in the construction which includes the first and second light reception means described above, the branching ratios of the first to fourth optical coupler means are preferably set in the following manner. In particular, a value obtained by dividing a power of light outputted from the third-first output port in response to input light from the third-first input port of the third optical coupler means by another power of light outputted from the third-second output port is set higher than another value obtained by dividing a power of light outputted from the second-first output port in response to input light from the second-first input port of the second optical coupler means by another power of light outputted from the second-second output port, and a value obtained by dividing a power of light outputted from the first-first output port in response to input light from the first-first input port of the first optical coupler means by another power of light outputted from the first-second output port is set higher than another value obtained by dividing a power of light outputted from the fourth-first output port in response to input light from the fourth-first input port of the fourth optical coupler means by another power of light outputted from the fourth-second output port.

With the first construction of the present invention, part of signal light from the ascending line is introduced into the descending line by the first optical coupler means and the fourth optical coupler means, thereby to construct a loop back path of the ascending line. Meanwhile, part of signal light from the descending line is introduced into the ascending line by the third optical coupler means and the second optical coupler means, thereby to construct a loop back path of the descending line. Accordingly, since a loop is not constructed in the optical repeater as in the prior art, circulation noise will not be superimposed on signal light for detection of a trouble, and the signal to noise ratio (SNR) of the signal light is improved and detection of a trouble can be achieved with a high degree of accuracy.

Further, where the powers of output light of the optical amplification means are controlled in response to the intensities of signal light from the light reception means, the intensity of the signal light to be transmitted can be controlled fixedly, and accordingly, the reliability in communication can be improved. It is to be noted that the reason why the branching ratios of the optical coupler means in the construction in which the light reception means is provided are set in such a manner as described above is that it is intended to reduce the influence of light sent to the light reception means by way of a loop back path.

(2) Second Construction of the Invention

According to the second construction of the present invention, an optical amplifier repeater comprises first optical amplification means for amplifying signal light transmitted along the ascending line, second optical amplification means for amplifying signal light transmitted along the descending line, first optical coupler means having a first-first input port, a first-first output port and a first-second output port, an input side of the ascending line being connected to the first-first input port by way of the first optical amplification means, second optical coupler means having a second-first input port, a second-second input port and a second-first output port, the first-first output port being connected to the second-first input port, an output side of the ascending line being connected to the second-first output port, third optical coupler means having a third-first input port, a third-first output port and a third-second output port, an input side of the descending line being connected to the third-first input port by way of the second optical amplification means, fourth optical coupler means having a fourth-first input port, a fourth-second input port and a fourth-first output port, the third-first output port being connected to the fourth-first input port, an output side of the descending line being connected to the fourth-first output port, fifth optical coupler means having a fifth-first input port, a fifth-second input port and a fifth-first output port, the first-second output port being connected to the fifth-second input port, the fourth-second input port being connected to the fifth-first output port, and sixth optical coupler means having a sixth-first input port, a sixth-second input port and a sixth-first output port, the fifth-first input port being connected to the sixth-first input port, the third-second output port being connected to the sixth-second input port, the second-second input port being connected to the sixth-first output port.

Each of the second optical coupler means, the fourth optical coupler means, the fifth optical coupler means and the sixth optical coupler means has such a bidirectionality that it functions from an input side to an output side thereof and from the output side to the input side thereof. Where each of the first to sixth optical coupler means has an additional input port or output port, the additional input port or output port is preferably processed by non-reflecting termination processing.

Further, in addition to the construction described above, the optical amplifier repeater can be constructed such that the second optical coupler means further has a second-second output port, and the fourth optical coupler means further has a fourth-second output port, and that the optical amplifier repeater further comprises first light reception means connected to the second-second output port, second light reception means connected to the fourth-second output port, first output fixing control means for controlling a power of output light of the first optical amplification means in response to an intensity of signal light from the first light reception means, and second output fixing control means for controlling a power of output light of the second optical amplification means in response to an intensity of signal light from the second light reception means.

In the construction described above, the optical amplifier repeater may be constructed such that the first optical amplification means includes an ion-doped fiber connected to the input side of the ascending line and doped with ions of erbium or a like element, a pumping light source for outputting pumping light of an intensity corresponding to an inrush current thereto, and optical wave combining means for introducing the pumping light to the ion-doped fiber, that the second optical amplification means includes an ion-doped fiber connected to the input side of the descending line, a pumping light source for outputting pumping light of an intensity corresponding to an inrush current thereto, and optical wave combining means for introducing the pumping light to the ion-doped fiber, that the first output fixing control means controls the inrush current to the pumping light source so that the intensity of the signal light at the first light reception means may be fixed, and that the second output fixing control means controls the inrush current to the pumping light source so that the intensity of the signal light at the second light reception means may be fixed.

Further, in the construction which includes the first and second light reception means described above, the branching ratios of the first to fourth optical coupler means are preferably set in the following manner. In particular, a value obtained by dividing a power of light outputted from the third-first output port in response to input light from the third-first input port of the third optical coupler means by another power of light outputted from the third-second output port is set higher than another value obtained by dividing a power of light outputted from the second-first output port in response to input light from the second-first input port of the second optical coupler means by another power of light outputted from the second-second output port, and a value obtained by dividing a power of light outputted from the first-first output port in response to input light from the first-first input port of the first optical coupler means by another power of light outputted from the first-second output port is set higher than a value obtained by dividing a power of light outputted from the fourth-first output port in response to input light from the fourth-first input port of the fourth optical coupler means by another power of light outputted from the fourth-second output port.

With the second construction of the present invention, part of signal light from the input side of the ascending line is introduced into the descending line by way of the first optical coupler means, the fifth optical coupler means and the fourth optical coupler means, thereby to construct a loop back path of the ascending line. Meanwhile, part of signal light from the input side of the descending line is introduced into the ascending line by way of the third optical coupler means, the sixth optical coupler means and the second optical coupler means, thereby to construct a loop back path of the descending line.

Further, reflected light from the output side of the ascending line is introduced into the output side of the descending line by way of the second optical coupler means, the sixth optical coupler means, the fifth optical coupler means and the fourth optical coupler means, thereby to construct a return path of the ascending line. Meanwhile, reflected light from the output side of the descending line is introduced into the output side of the ascending line by the fourth optical coupler means, the fifth optical coupler means, the sixth optical coupler means and the second optical coupler means, thereby to construct a return path of the descending line.

Accordingly, since a loop is not constructed as in the prior art, circulation noise will not be superimposed on signal light or reflected light for detection of a trouble, and the signal to noise ratio (SNR) of the signal light or reflected light is improved and detection of a trouble can be achieved with a high degree of accuracy. Further, where the powers of output light of the optical amplification means are controlled in response to the intensities of signal light from the light reception means, the intensity of the signal light to be transmitted can be controlled fixedly, and accordingly, the reliability in communication can be improved. It is to be noted that the reason why the branching ratios of the optical coupler means in the construction in which the light reception means is provided are set in such a manner as described above is that it is intended to reduce the influence of light sent to the light reception means by way of a loop back path.

(3) Third Construction of the Invention

According to the third construction of the present invention, an optical amplifier repeater comprises first optical amplification means for amplifying signal light transmitted along the ascending line, second optical amplification means for amplifying signal light transmitted along the descending line, first optical coupler means having a first-first input port, a first-first output port and a first-second output port, an input side of the ascending line being connected to the first-first input port by way of the first optical amplification means, second optical coupler means having a second-first input port, a second-second input port, a second-third input port and a second-first output port, the first-first output port being connected to the second-first input port, an output side of the ascending line being connected to the second-first output port, third optical coupler means having a third-first input port, a third-first output port and a third-second output port, an input side of the descending line being connected to the third-first input port by way of the second optical amplification means, the second-second input port being connected to the third-second output port, and fourth optical coupler means having a fourth-first input port, a fourth-second input port, a fourth-third input port and a fourth-first output port, the third-first output port being connected to the fourth-first input port, the first-second output port being connected to the fourth-second input port, the second-third input port being connected to the fourth-third input port, an output side of the descending line being connected to the fourth-first output port.

Each of the second and fourth optical coupler means has such a bidirectionality that it functions from an input side to an output side thereof and from the output side to the input side thereof. Where each of the first to fourth optical coupler means has an additional input port or output port, the additional input port or output port is preferably processed by non-reflecting termination processing.

Further, in addition to the construction described above, the optical amplifier repeater may be constructed such that the second optical coupler means further has a second-second output port, and the fourth optical coupler means further has a fourth-second output port, and that the optical amplifier repeater further comprises first light reception means connected to the second-second output port, second light reception means connected to the fourth-second output port, first output fixing control means for controlling a power of output light of the first optical amplification means in response to an intensity of signal light from the first light reception means, and second output fixing control means for controlling a power of output light of the second optical amplification means in response to an intensity of signal light from the second light reception means.

In the construction described above, the optical amplifier repeater may be constructed such that the first optical amplification means includes an ion-doped fiber connected to the input side of the ascending line and doped with ions of erbium or a like element, a pumping light source for outputting pumping light of an intensity corresponding to an inrush current thereto, and optical wave combining means for introducing the pumping light to the ion-doped fiber, that the second optical amplification means includes an ion-doped fiber connected to the input side of the descending line, a pumping light source for outputting pumping light of an intensity corresponding to an inrush current thereto, and optical wave combining means for introducing the pumping light to the ion-doped fiber, that the first output fixing control means controls the inrush current to the pumping light source so that the intensity of the signal light at the first light reception means may be fixed, and that the second output fixing control means controls the inrush current to the pumping light source so that the intensity of the signal light at the second light reception means may be fixed.

Further, in the construction which includes the first and second light reception means described above, the branching ratios of the first to fourth optical coupler means are preferably set in the following manner. In particular, a value obtained by dividing a power of light outputted from the third-first output port in response to input light from the third-first input port of the third optical coupler means by another power of light outputted from the third-second output port is set higher than another value obtained by dividing a power of light outputted from the second-first output port in response to input light from the second-first input port of the second optical coupler means by another power of light outputted from the second-second output port, and a value obtained by dividing a power of light outputted from the first-first output port in response to input light from the first-first input port of the first optical coupler means by another power of light outputted from the first-second output port is set higher than another value obtained by dividing a power of light out putted from the fourth-first output port in response to input light from the fourth-first input port of the fourth optical coupler means by another power of light outputted from the fourth-second output port.

With the third construction of the present invention, part of signal light from the input side of the ascending line is introduced into the descending line by way of the first optical coupler means and the fourth optical coupler means, thereby to construct a loop back path of the ascending line. Meanwhile, part of signal light from the input side of the descending line is introduced into the ascending line by the third optical coupler means and the second optical coupler means, thereby to construct a loop back path of the descending line.

Further, reflected light from the output side of the ascending line is introduced into the output side of the descending line by the second optical coupler means and the fourth optical coupler means, thereby to construct a return path of the ascending line. Meanwhile, reflected light from the output side of the descending line is introduced to the output side of the ascending line by the fourth optical coupler means and the second optical coupler means, thereby to construct a return path of the descending line.

Accordingly, since a loop is not constructed as in the prior art, circulation noise will not be superimposed on signal light or reflected light for detection of a trouble, and the signal to noise ratio (SNR) of the signal light or reflected light is improved and detection of a trouble can be achieved with a high degree of accuracy. Further, where the powers of output light of the optical amplification means are controlled in response to the intensities of signal light from the light reception means, the intensity of the signal light to be transmitted can be controlled fixedly, and accordingly, the reliability in communication can be improved. It is to be noted that the reason why the branching ratios of the optical coupler means in the construction in which the light reception means is provided are set in such a manner as described above is that it is intended to reduce the influence of light sent to the light reception means by way of a loop back path.

(4) Fourth Construction of the Invention

According to the fourth construction of the present invention, an optical amplifier repeater comprises first optical amplification means for amplifying signal light transmitted along the ascending line, second optical amplification means for amplifying signal light transmitted along the descending line, first optical coupler means having a first-first input port, a first-first output port and a first-second output port, an input side of the ascending line being connected to the first-first input port by way of the first optical amplification means, second optical coupler means having a second-first input port, a second-second input port and a second-first output port, the first-first output port being connected to the second-first input port, an output side of the ascending line being connected to the second-first output port, third optical coupler means having a third-first input port, a third-first output port and a third-second output port, an input side of the descending line being connected to the third-first input port by way of the second optical amplification means, fourth optical coupler means having a fourth-first input port, a fourth-second input port and a fourth-first output port, the third-first output port being connected to the fourth-first input port, an output side of the descending line being connected to the fourth-first output port, and fifth optical coupler means having a fifth-first input port, a fifth-second input port, a fifth-first output port and a fifth-second output port, the first-second output port being connected to the fifth-second input port, the fourth-second input port being connected to the fifth-second output port, the third-second output port being connected to the fifth-first output port, the second-second input port being connected to the fifth-first input port.

Each of the second optical coupler means, the fourth optical coupler means and the fifth optical coupler means has such a bidirectionality that it functions from an input side to an output side thereof and from the output side to the input side thereof. Where each of the first to fifth optical coupler means has an additional input port or output port, the additional input port or output port is preferably processed by non-reflecting termination processing.

Further, in addition to the construction described above, the optical amplifier repeater may be constructed such that the second optical coupler means further has a second-second output port, and the fourth optical coupler means further has a fourth-second output port, and that the optical amplifier repeater further comprises first light reception means connected to the second-second output port, second light reception means connected to the fourth-second output port, first output fixing control means for controlling a power of output light of the first optical amplification means in response to an intensity of signal light from the first light reception means, and second output fixing control means for controlling a power of output light of the second optical amplification means in response to an intensity of signal light from the second light reception means.

In the construction described above, the optical amplifier repeater may be constructed such that the first optical amplification means includes an ion-doped fiber connected to the input side of the ascending line and doped with ions of erbium or a like element, a pumping light source for outputting pumping light of an intensity corresponding to an inrush current thereto, and optical wave combining means for introducing the pumping light to the ion-doped fiber, that the second optical amplification means includes an ion-doped fiber connected to the input side of the descending line, a pumping light source for outputting pumping light of an intensity corresponding to an inrush current thereto, and optical wave combining means for introducing the pumping light to the ion-doped fiber, that the first output fixing control means controls the inrush current to the pumping light source so that the intensity of the signal light at the first light reception means may be fixed, and that the second output fixing control means controls the inrush current to the pumping light source so that the intensity of the signal light at the second light reception means may be fixed.

Further, in the construction which includes the first and second light reception means described above, the branching ratios of the first to fourth optical coupler means are preferably set in the following manner. In particular, a value obtained by dividing a power of light outputted from the third-first output port in response to input light from the third-first input port of the third optical coupler means by another power of light outputted from the third-second output port is set higher than another value obtained by dividing a power of light outputted from the second-first output port in response to input light from the second-first input port of the second optical coupler means by another power of light outputted from the second-second output port, and a value obtained by dividing a power of light outputted from the first-first output port in response to input light from the first-first input port of the first optical coupler means by another power of light outputted from the first-second output port is set higher than another value obtained by dividing a power of light out putted from the fourth-first output port in response to input light from the fourth-first input port of the fourth optical coupler means by another power of light outputted from the fourth-second output port.

With the fourth construction of the present invention, part of signal light from the input side of the ascending line is introduced into the descending line by way of the first optical coupler means, the fifth optical coupler means and the fourth optical coupler means, thereby to construct a loop back path of the ascending line. Meanwhile, part of signal light from the input side of the descending line is introduced into the ascending line by way of the third optical coupler means, the fifth optical coupler means and the second optical coupler means, thereby to construct a loop back path of the descending line.

Further, reflected light from the output side of the ascending line is introduced into the output side of the descending line by way of the second optical coupler means, the fifth optical coupler means and the fourth optical coupler means, thereby to construct a return path of the ascending line. Meanwhile, reflected light from the output side of the descending line is introduced to the output side of the ascending line by the fourth optical coupler means, the fifth optical coupler means and the second optical coupler means, thereby to construct a return path of the descending line.

Accordingly, since a loop is not constructed as in the prior art, circulation noise will not be superimposed on signal light or reflected light for detection of a trouble, and the signal to noise ratio (SNR) of the signal light or reflected light is improved and detection of a trouble can be achieved with a high degree of accuracy. Further, where the powers of output light of the optical amplification means are controlled in response to the intensities of signal light from the light reception means, the intensity of the signal light to be transmitted can be controlled fixedly, and accordingly, the reliability in communication can be improved. It is to be noted that the reason why the branching ratios of the optical coupler means in the construction in which the light reception means is provided are set in such a manner as described above is that it is intended to reduce the influence of light sent to the light reception means by way of a loop back path.

(5) Fifth Construction of the Invention

According to the fifth construction of the present invention, an optical amplifier repeater comprises first optical amplification means for amplifying signal light transmitted along the ascending line, second optical amplification means for amplifying signal light transmitted along the descending line, first optical isolator means for passing an optical signal only from an input side to an output side therethrough, second optical isolator means for passing an optical signal only from an input side to an output side therethrough, first optical coupler means having a first-first input port, a first-second input port, a first-first output port and a first-second output port, an input side of the ascending line being connected to the first-first input port by way of the first optical amplification means, an output side of the ascending line being connected to the first-first output, the input side of the first optical isolator means being connected to the first-second output port, second optical coupler means having a second-first input port, a second-second input port and a second-first output port, the output side of the first optical isolator means being connected to the second-first input port, third optical coupler means having a third-first input port, a third-second input port, a third-first output port and a third-second output port, an input side of the descending line being connected to the third-first input port by way of the second optical amplification means, the second-first output port being connected to the third-second input port, an output side of the descending line being connected to the third-first output, the input side of the second optical isolator means being connected to the third-second output port, and fourth optical coupler means having a fourth-first input port, a fourth-second input port and a fourth-first output port, the output side of the second optical isolator means being connected to the fourth-first input port, the second-second input port being connected to the fourth-second input port, the first-second input port being connected to the fourth-first output port.

Each of the first to fourth optical coupler means has such a bidirectionality that it functions from an input side to an output side thereof and from said output side to said input side thereof. Where each of the first to fourth optical coupler means has an additional input port or output port, the additional input port or output port is preferably processed by non-reflecting termination processing.

With the fifth construction of the present invention, the first optical isolator means for passing light only in a direction from the first optical coupler means toward the second optical coupler means therethrough is interposed between the first optical coupler means and the second optical coupler means. Meanwhile, the second optical isolator means for passing light only in a direction from the third optical coupler means toward the fourth optical coupler means therethrough is interposed between the third optical coupler means and the fourth optical coupler means.

Consequently, since passage of light advancing in the opposite direction is prevented by the first or second optical isolator means, the number of optical transmission lines to constitute loops is reduced comparing with the second conventional optical amplifier repeater shown in FIG. 15 which does not include the first or second optical isolator means. In particular, referring to FIG. 15, since the path h and the path 1 which are not used for any of a normal loop back path and a normal return path are deleted, the second abnormal return path and the third abnormal return path of the ascending line and the second abnormal return path and the third abnormal return path described above are eliminated. Accordingly, since the number of optical transmission lines to construct loops is reduced and circulation noise which is superimposed on reflected light for detection of a trouble is reduced, the signal to noise ratio (SNR) of the reflected light becomes comparatively good and detection of a trouble with a comparatively high degree of accuracy can be achieved.

(6) In this manner, with the optical amplifier repeaters according to the present invention, since a loop is not constructed from a plurality of optical coupler means and optical transmission lines interconnecting the optical coupler means which construct loop back paths and/or return paths or such loops can be reduced comparing with the prior art, superimposition of circulation noise on signal light or reflected light is eliminated or reduced, and the signal to noise ratio can be improved remarkably. Accordingly, in an optical amplification multi-stage repeating system in which such optical amplifier repeater is employed, detection of a trouble and specification of a location of the trouble can be performed with a high degree of accuracy, and the reliability of the system can be improved. Further, it is also possible to keep the intensity of signal light stable, and the reliability in communication can be improved.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

In the following, optical amplifier repeaters to which the present invention is applied will be described in detail with reference to the drawings. It is to be noted that, in the following description, an optical coupler signifies an optical wave splitter, an optical wave combiner or an optical wave splitter-combiner having functions of both of them.

(1) First Embodiment

Figure 1:
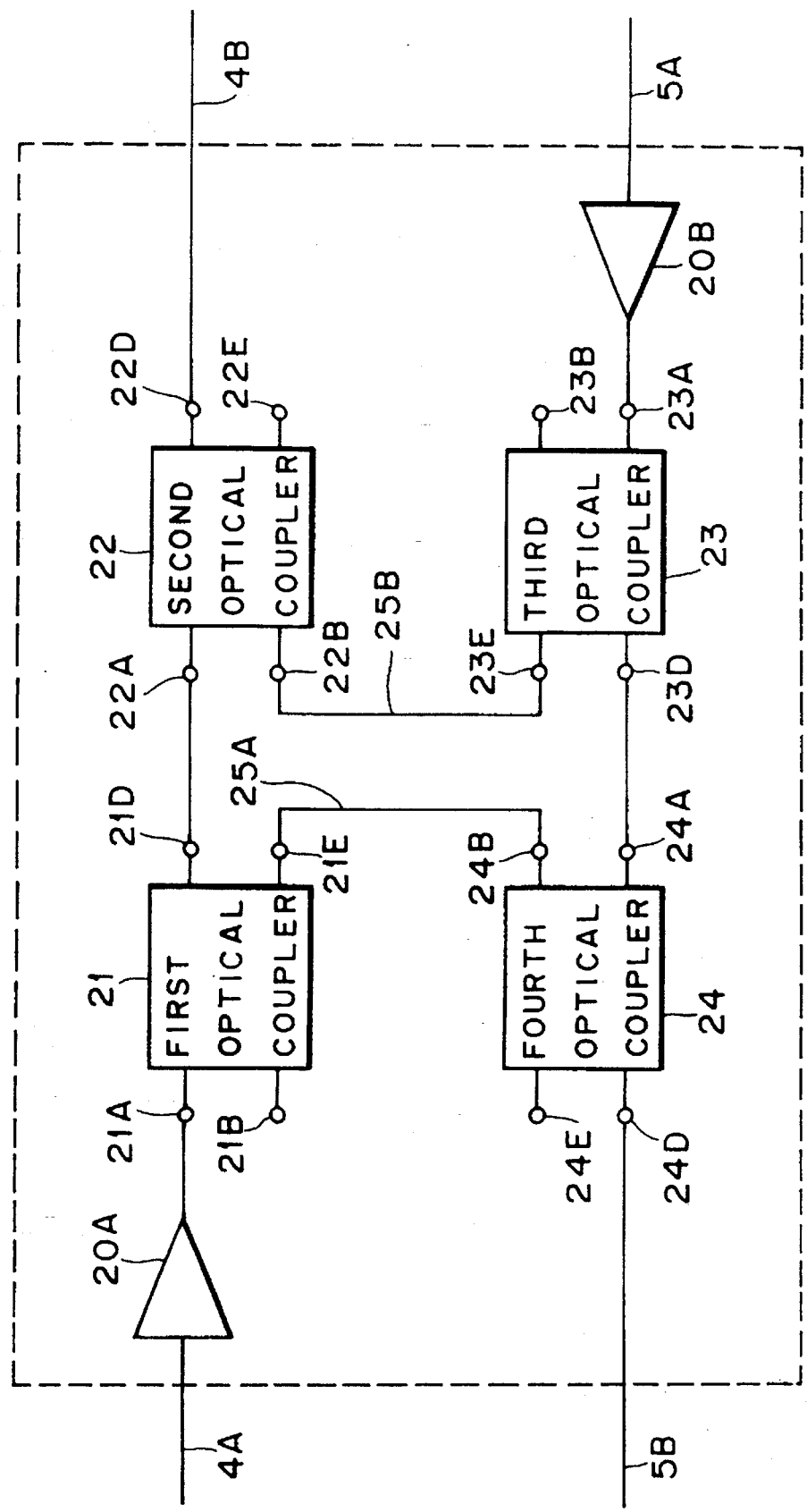
FIG. 1 is a view showing a basic construction of a first embodiment of the present invention.

FIG. 1 is a view showing a basic construction of the first embodiment of the present invention. The optical amplifier repeater shown includes an ascending optical amplifier 20A, a descending optical amplifier 20B, a first optical coupler 21, a second optical coupler 22, a third optical coupler 23 and a fourth optical coupler 24.

Figure 2:
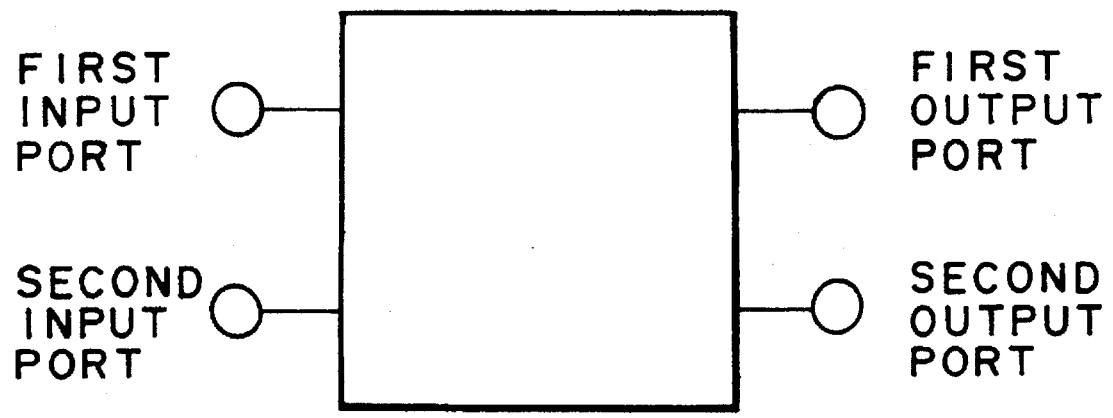
FIG. 2 is a view showing a construction of a two-input two-output optical coupler.

Each of the first to fourth optical couplers 21, 22, 23 and 24 is a two-input two-output optical coupler having, as shown in FIG. 2, a first input port, a second input port, a first output port and a second output port. Further, each of the first to fourth optical couplers 21, 22, 23 and 24 is a directional optical coupler which only functions from the input side toward the output side thereof. It is to be noted that each of the first to fourth optical couplers 21, 22, 23 and 24 may be a bidirectional optical coupler which functions from the input side toward the output side thereof and from the output side toward the input side thereof.

The input side of the ascending optical amplifier 20A is connected to an input side 4A of an ascending line, and the output side of the ascending optical amplifier 20A is connected to the first input port 21A of the first optical coupler 21. The first output port 21D of the first optical coupler 21 is connected to the first input port 22A of the second optical coupler 22, and the first output port 22D of the second optical coupler 22 is connected to an output side 4B of the ascending line. The input side of the descending optical amplifier 20B is connected to an input side 5A of a descending line, and the output side of the descending optical amplifier 20B is connected to the first input port 23A of the third optical coupler 23. The first output port 23D of the third optical coupler 23 is connected to the first input port 24A of the fourth optical coupler 24, and the first output port 24D of the fourth optical coupler 24 is connected to an output side 5B of the descending line.

The second output port 21E of the first optical coupler 21 and the second input port 24B of the fourth optical coupler 24 are connected to each other by a first optical transmission line 25A, and the second input port 22B of the second optical coupler 22 and the second output port 23E of the third optical coupler 23 are connected to each other by a second optical transmission line 25B. The second input port 21B of the first optical coupler 21, the second output port 22E of the second optical coupler 22, the second input port 23B of the third optical coupler 23 and the second output port 24E of the fourth optical coupler 24 are each processed by non-reflecting termination processing so as to prevent deterioration in light transmission characteristic by reflected light at the location. The non-reflecting termination processing may be such processing as, for example, to form an end face of an optical fiber constituting the port as a face inclined by about 8 degrees with reference to a plane perpendicular to an axial line of the optical fiber, to wind an optical fiber constituting the port in a plurality of turns or to soak an end of an optical fiber constituting the port in liquid of a predetermined refractive index.

Thus, signal light sent from the input side 4A of the ascending line is amplified by the ascending optical amplifier 20A and sent to the output side 4B of the ascending line by way of the first input port 21A and the first output port 21D of the first optical coupler 21 and the first input port 22A and the first output port 22D of the second optical coupler 22. Meanwhile, signal light sent from the input side 5A of the descending line is amplified by the descending optical amplifier 20B and sent to the output side 5B of the descending line by way of the first input port 23A and the first output port of 23D the third optical coupler 23 and the first input port 24A and the first output port 24D of the fourth optical coupler 24.

Part of the signal light inputted to the first optical coupler 21 is outputted from the second output port 21E of the first optical coupler 21 and sent to the output side 5B of the descending line by way of the first optical transmission line 25A and the second input port 24B and the first output port 24D of the fourth optical coupler 24. Further, part of the signal light inputted to the third optical coupler 23 is outputted from the second output port 23E of the third optical coupler 23 and sent to the output side 4B of the ascending line by way of the second optical transmission line 25B and the second input port 22B and the first output port 22D of the second optical coupler 22.

In this manner, a loop back path of the ascending line is constituted from the first optical coupler 21, the first optical transmission line 25A and the fourth optical coupler 24. Further, a loop back path of the descending line is constituted from the third optical coupler 23, the second optical transmission line 25B and the second optical coupler 22.

According to the present embodiment, the loop back paths of the ascending line and the descending line are constructed without constructing a loop in the optical amplifier repeater. Accordingly, since circulation noise will not be superimposed on signal light introduced from the ascending line into the descending line by way of the loop back paths or signal light introduced from the descending line into the ascending line by way of the loop back paths, the signal to noise ratio (SNR) of the signal light is improved, and detection of a trouble can be achieved with a high degree of accuracy.

Figure 3:
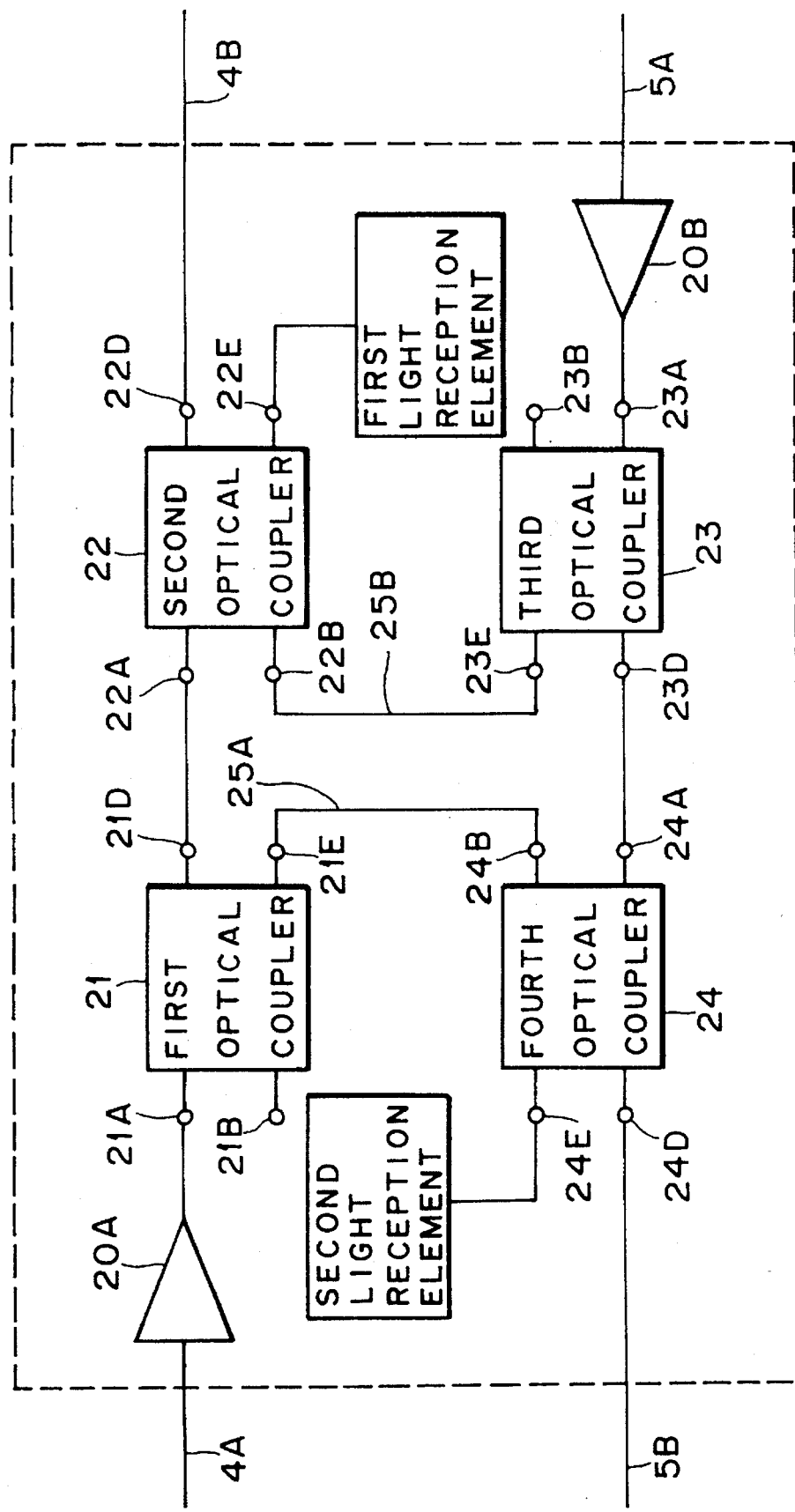
FIG. 3 is a view showing an improved construction of the first embodiment of the present invention.

Subsequently, an improved construction of the first embodiment will be described with reference to FIGS. 3 and 4. It is to be noted that substantially same components to those of FIG. 1 are denoted by same reference characters and description of them is omitted herein. In particular, a first light reception element 26A is connected to the second output port 22E of the second optical coupler 22, and a second light reception element 26B is connected to the second output port 24E of the fourth optical coupler 24.

Figure 4:
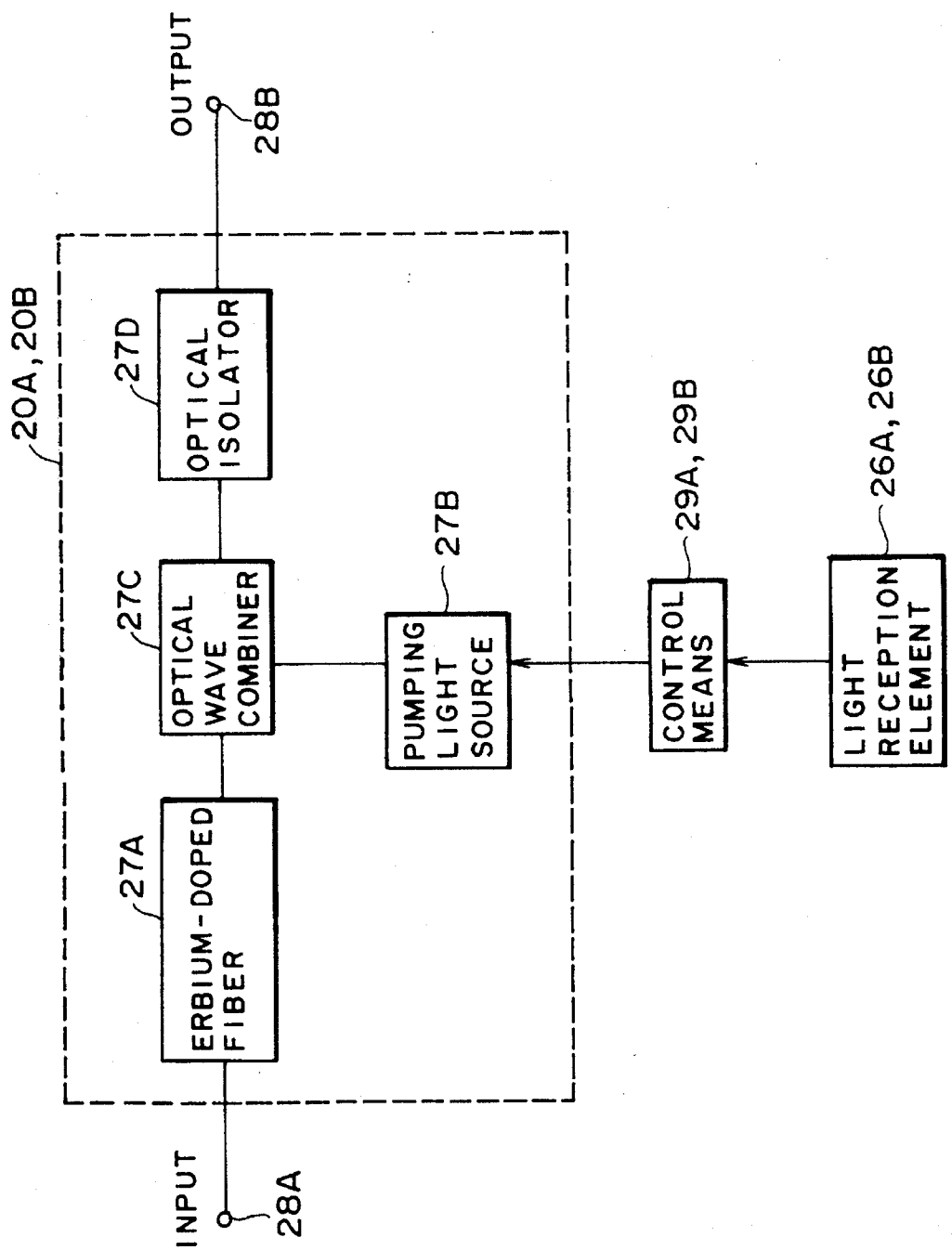
FIG. 4 is a view showing a construction of an optical amplifier.

Further, each of the ascending optical amplifier 20A and the descending optical amplifier 20B is constructed in such a manner as shown in FIG. 4. Referring to FIG. 4, reference character 27A denotes an erbium-doped fiber which amplifies signal light sent thereto from an input terminal 28A in response to pumping light. Reference character 27B denotes a pumping light source for outputting pumping light of an intensity corresponding to an inrush current thereto, and 27C denotes an optical wave combiner for introducing pumping light from the pumping light source 27B into the erbium-doped fiber 27A. An optical isolator 27D is provided on the downstream side of the optical wave combiner 27C for preventing oscillations by spontaneous emission light, and the output side of the optical isolator 27D is connected to an output terminal 28B. Signal light from the input terminal 28A is inputted from an end of the erbium-doped fiber 27A while pumping light sent from the pumping light source 27B by way of the optical wave combiner 27C is inputted from the other end of the erbium-doped fiber 27A. In the erbium-doped fiber 27A, the signal light is pumped by the pumping light in response to the energy level of ions of doped erbium and is thus amplified by stimulated emission by the pumping light. The thus amplified signal light is outputted from the output terminal 28B by way of the optical wave combiner 27C and the optical isolator 27D. It is to be noted that, while the foregoing describes an example wherein back pumping is employed, front pumping may naturally be employed. Further, while the foregoing describes an example wherein an erbium-doped fiber is employed, another optical fiber doped with ions of another element may be employed.

The output of the first light reception element 26A is sent to first output fixing control means 29A, and the inrush current to the pumping light source 27B of the ascending optical amplifier 20A is controlled in response to the output of the first light reception element 26A by the first output fixing control means 29A. This control is performed so that the intensity of light to be incident to the first light reception element 26A may always be fixed. Meanwhile, the output of the second light reception element 26B is sent to second output fixing control means 29B, and the inrush current to the pumping light source 27B of the descending optical amplifier 20B is controlled in response to the output of the second light reception element 26B by the second output fixing control means 29B. This control is performed so that the intensity of light to be incident to the second light reception element 26B may always be fixed.

Since the power of output light of the ascending or descending optical amplifier 20A or 20B is controlled in response to the amount of light of the first or second light reception element 26A or 26B in this manner, the signal light outputted from the optical amplifier repeater is always stable, and communication with a high degree of reliability can be realized.

It is to be noted that, in the present construction, the branching ratios of the first to fourth optical couplers 21, 22, 23 and 24 are set in the following manner. The branching ratios of the third optical coupler 23 and the second optical coupler 22 are set such that a value obtained by dividing the power of light outputted from the first output port 23D of the third optical coupler 23 in response to input light from the first input port 23A of the third optical coupler 23 by the power of light outputted from the second output port 23E of the third optical coupler 23 in response to the input light from the first input port 23A of the third optical coupler 23 may be higher than another value obtained by dividing the power of light outputted from the first output port 22D of the second optical coupler 22 in response to input light from the first input port 22A of the second optical coupler 22 by the power of light outputted from the second output port 22E of the second optical coupler 22 in response to the light from the first input port 22A of the second optical coupler 22. In particular, where the power of light inputted from the first input port 23A of the third optical coupler 23 is represented by "1"; the power of light outputted from the first output port 23D of the third optical coupler 23 by "c"; the power of light outputted from the second output port 23E of the third optical coupler 23 by "1-c"; the power of light inputted from the first input port 22A of the second optical coupler 22 by "1"; the power of light outputted from the first output port 22D of the second optical coupler 22 by "b"; and the power of light outputted from the second output port 22E of the second optical coupler 22 by "1-b", the branching ratios of the third optical coupler 23 and the second optical coupler 22 are set so as to satisfy $$c/(1-c) > b/(1-b)$$

Meanwhile, the branching ratios of the first optical coupler 21 and the fourth optical coupler 24 are set such that a value obtained by dividing the power of light outputted from the first output port 21D of the first optical coupler 21 in response to input light from the first input port 21A of the first optical coupler 21 by the power of light outputted from the second output port 21E of the first optical coupler 21 in response to the input light from the first input port of 21A the first optical coupler 21 may be higher than another value obtained by dividing the power of light outputted from the first output port 24D of the fourth optical coupler 24 in response to input light from the first input port 24A of the fourth optical coupler 24 by the power of light outputted from the second output port 24E of the fourth optical coupler 24 in response to the light from the first input port 24A of the fourth optical coupler 24. In particular, where the power 21A of light inputted from the first input port 21A of the first optical coupler 21 is represented by "1"; the power of light outputted from the first output port 21D of the first optical coupler 21 by "a"; the power of light outputted from the second output port 21E of the first optical coupler 21 by "1-a"; the power of light inputted from the first input port 24A of the fourth optical coupler 24 by "1"; the power of light outputted from the first output port 24D of the fourth optical coupler 24 by "d"; and the power of light outputted from the second output port 24E of the fourth optical coupler 24 by "1-d", the branching ratios of the first optical coupler 21 and the fourth optical coupler 24 are set so as to satisfy $$a/(1-a) > d/(1-d)$$

The reason why the branching ratios are set in such a manner as described is such as follows. Both of light sent from the ascending optical amplifier 20A by way of the first optical coupler 21 and the second optical coupler 22 and light sent from the descending optical amplifier 20B by way of the third optical coupler 23 and the second optical coupler 22 are inputted to the first light reception element 26A. However, for the control of the ascending optical amplifier 20A, only the light from the former is important, and the light from the latter is mere noise. Accordingly, the reason is that the detection sensitivity of the first light reception element 26A can be improved by making the power of light from the former sufficiently higher than the power of light from the latter. This similarly applies to the second light reception element 26B.

(2) Second Embodiment

Figure 5:
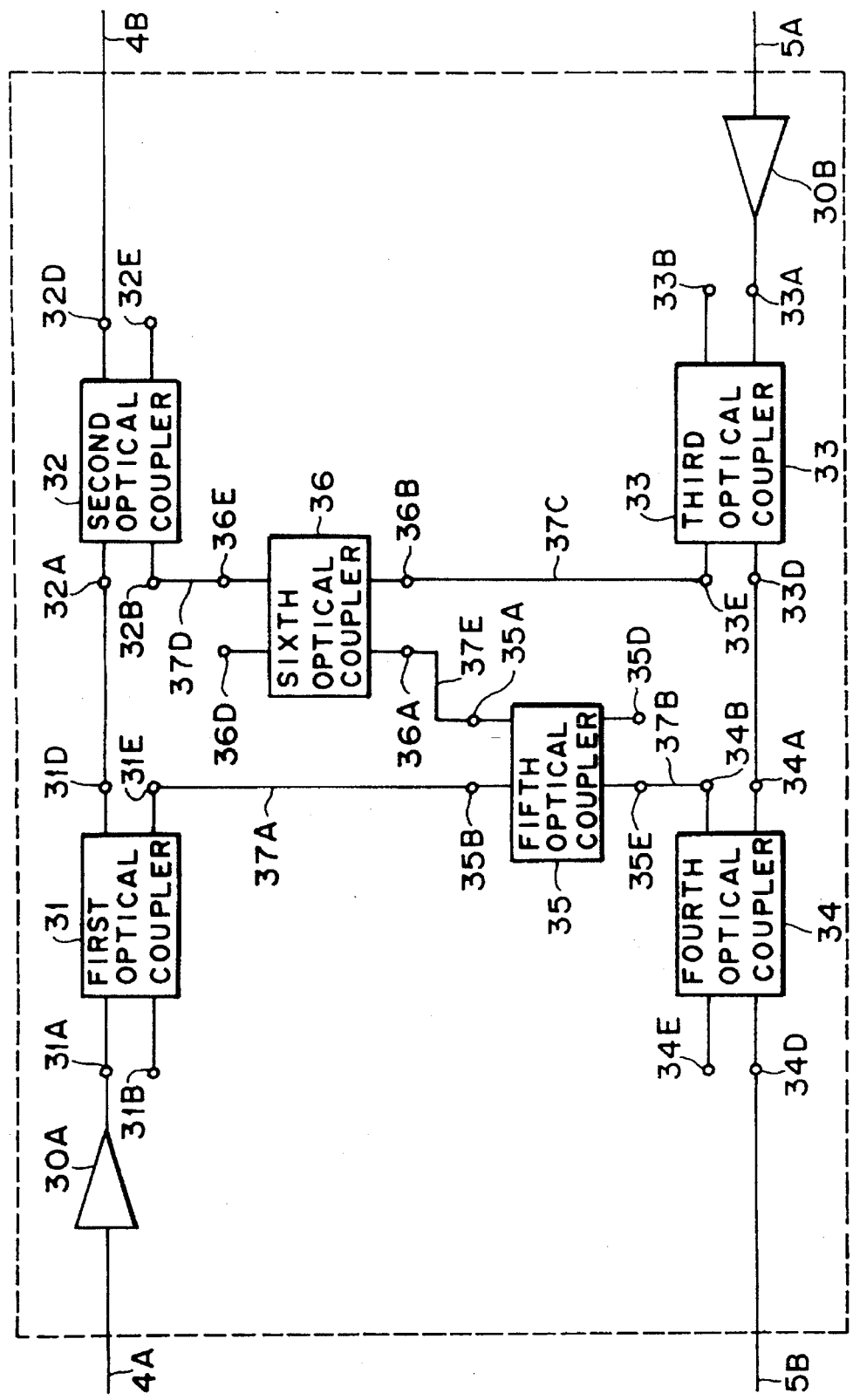
FIG. 5 is a view showing a basic construction of a second embodiment of the present invention.

FIG. 5 is a view showing a basic construction of a second embodiment of the present invention. The optical amplifier repeater shown includes an ascending optical amplifier 30A, a descending optical amplifier 30B, a first optical coupler 31, a second optical coupler 32, a third optical coupler 33, a fourth optical coupler 34, a fifth optical coupler 35 and a sixth optical coupler 36. Each of the first to sixth optical couplers 31, 32, 33, 34, 35 and 36 is a two-input two-output optical coupler having, as shown in FIG. 2, a first input port, a second input port, a first output port and a second output port. Further, each of the first and third optical couplers 31 and 33 is a directional optical coupler which only functions from the input side toward the output side thereof. It is to be noted that each of the first and third optical couplers 31 and 33 may be a bidirectional optical coupler which functions from the input side toward the output side thereof and from the output side toward the input side thereof. Meanwhile, each of the second, fourth, fifth and sixth optical couplers 32, 34, 35 and 36 is a bidirectional optical coupler which functions from the input side toward the output side thereof and from the output side toward the input side thereof.

The input side of the ascending optical amplifier 30A is connected to an input side 4A of an ascending line, and the output side of the ascending optical amplifier 30A is connected to the first input port 31A of the first optical coupler 31. The first output port 31D of the first optical coupler 31 is connected to the first input port 32A of the second optical coupler 32, and the first output port 32D of the second optical coupler 32 is connected to an output side 4B of the ascending line. The input side of the descending optical amplifier 30B is connected to an input side 5A of a descending line, and the output side of the descending optical amplifier 30B is connected to the first input port 33A of the third optical coupler 33. The first output port 33D of the third optical coupler 33 is connected to the first input port 34A of the fourth optical coupler 34, and the first output port 34D of the fourth optical coupler 34 is connected to an output side 5B of the descending line.

The second input port 35B of the fifth optical coupler 35 is connected to the second output port 31E of the first optical coupler 31 by way of a first optical transmission line 37A, and the second output port 35E of the fifth optical coupler 35 is connected to the second input port 34B of the fourth optical coupler 34 by way of a second optical transmission line 37B. The second input port 36B of the sixth optical coupler 36 is connected to the second output port 33E of the third optical coupler 33 by way of a third optical transmission line 37C, and the second output port 36E of the sixth optical coupler 36 is connected to the second input port 32B of the second optical coupler 32 by way of a fourth optical transmission line 37D. The first input port 35A of the fifth optical coupler 35 and the first input port 36A of the sixth optical coupler 36 are connected to each other by way of a fifth optical transmission line 37E.

The second input port 31B of the first optical coupler 31, the second output port 32E of the second optical coupler 32, the second input port 33B of the third optical coupler 33, the second output port 34E of the fourth optical coupler 34, the first output port 35D of the fifth optical coupler 35 and the first output port 36D of the sixth optical coupler 36 are each processed by non-reflecting termination processing so as to prevent deterioration in light transmission characteristic by reflected light at the location. The non-reflecting termination processing may be such processing as, for example, to form an end face of an optical fiber constituting the port as a face inclined by about 8 degrees with reference to a plane perpendicular to an axial line of the optical fiber, to wind an optical fiber constituting the port in a plurality of turns or to soak an end of an optical fiber constituting the port in liquid of a predetermined refractive index.

Thus, signal light sent from the input side 4A of the ascending line is amplified by the ascending optical amplifier 30A and sent to the output side 4B of the ascending line by way of the first input port 31A and the first output port 31D of the first optical coupler 31 and the first input port 32A and the first output port 32D of the second optical coupler 32. Meanwhile, signal light sent from the input side 5A of the descending line is amplified by the descending optical amplifier 30B and sent to the output side 5B of the descending line by way of the first input port 33A and the first output port 33D of the third optical coupler 33 and the first input port 34A and the first output port 34D of the fourth optical coupler 34.

Part of the signal light inputted to the first optical coupler 31 is outputted from the second output port 31E of the first optical coupler 31 and sent to the output side 5B of the descending line by way of the first optical transmission line 37A, the second input port 35B and the second output port 35E of the fifth optical coupler 35, the second optical transmission line 37B, and the second input port 34B and the first output port 34D of the fourth optical coupler 34. Meanwhile, part of the signal light inputted to the third optical coupler 33 is outputted from the second output port 33E of the third optical coupler 33 and sent to the output side 4B of the ascending line by way of the third optical transmission line 37C, the second input port 36B and the second output port 36E of the sixth optical coupler 36, the fourth optical transmission line 37D, and the second input port 32B and the first output port 32D of the second optical coupler 32.

In this manner, a loop back path of the ascending line is constituted from the first optical coupler 31, the first optical transmission line 37A, the fifth optical coupler 35, the second optical transmission line 37B and the fourth optical coupler 34. Further, a loop back path of the descending line is constituted from the third optical coupler 33, the third optical transmission line 37C, the sixth optical coupler 36, the fourth optical transmission line 37D and the second optical coupler 32.

Meanwhile, reflected light from the output side 4B of the ascending line is inputted from the first output port 32D of the second optical coupler 32 and sent to the output side 5B of the descending line by way of the second input port 32B of the second optical coupler 32, the fourth optical transmission line 37D, the second output port 36E and the first input port 36A of the sixth optical coupler 36, the fifth optical transmission line 37E, the first input port 35A and the second output port 35E of the fifth optical coupler 35, the second optical transmission line 37B, and the second input port 34B and the first output port 34D of the fourth optical coupler 34. Further, reflected light from the output side 5B of the descending line is inputted from the first output port 34D of the fourth optical coupler 34 and sent to the output side 4B of the ascending line by way of the second input port 34B of the fourth optical coupler 34, the second optical transmission line 37B, the second output port 35E and the first input port 35A of the fifth optical coupler 35, the fifth optical transmission line 37E, the first input port 36A and the second output port 36E of the sixth optical coupler 36, the fourth optical transmission line 37D, and the second input port 32B and the first output port 32D of the second optical coupler 32.

In this manner, a return path of the ascending line is constituted from the second optical coupler 32, the fourth optical transmission line 37D, the sixth optical coupler 36, the fifth optical transmission line 37E, the fifth optical coupler 35, the second optical transmission line 37B and the fourth optical coupler 34. Meanwhile, a return path of the descending line is constituted from the fourth optical coupler 34, the second optical transmission line 37B, the fifth optical coupler 35, the fifth optical transmission line 37E, the sixth optical coupler 36, the fourth optical transmission line 37D and the second optical coupler 32.

According to the present embodiment, the loop back paths and the return paths of the ascending line and the descending line are constructed without constructing a loop in the optical amplifier repeater. Accordingly, circulation noise will not be superimposed on signal light introduced from the ascending line into the descending line by way of the loop back paths or signal light introduced from the descending line into the ascending line by way of the loop back paths. Meanwhile, circulation noise will not be superimposed on reflected light introduced from the ascending line into the descending line by way of the return paths or reflected light introduced from the descending line into the ascending line by way of the return paths. Accordingly, the signal to noise ratio (SNR) of the signal light or reflected light is improved, and detection of a trouble and specification of a trouble location can be achieved with a high degree of accuracy.

Figure 6:
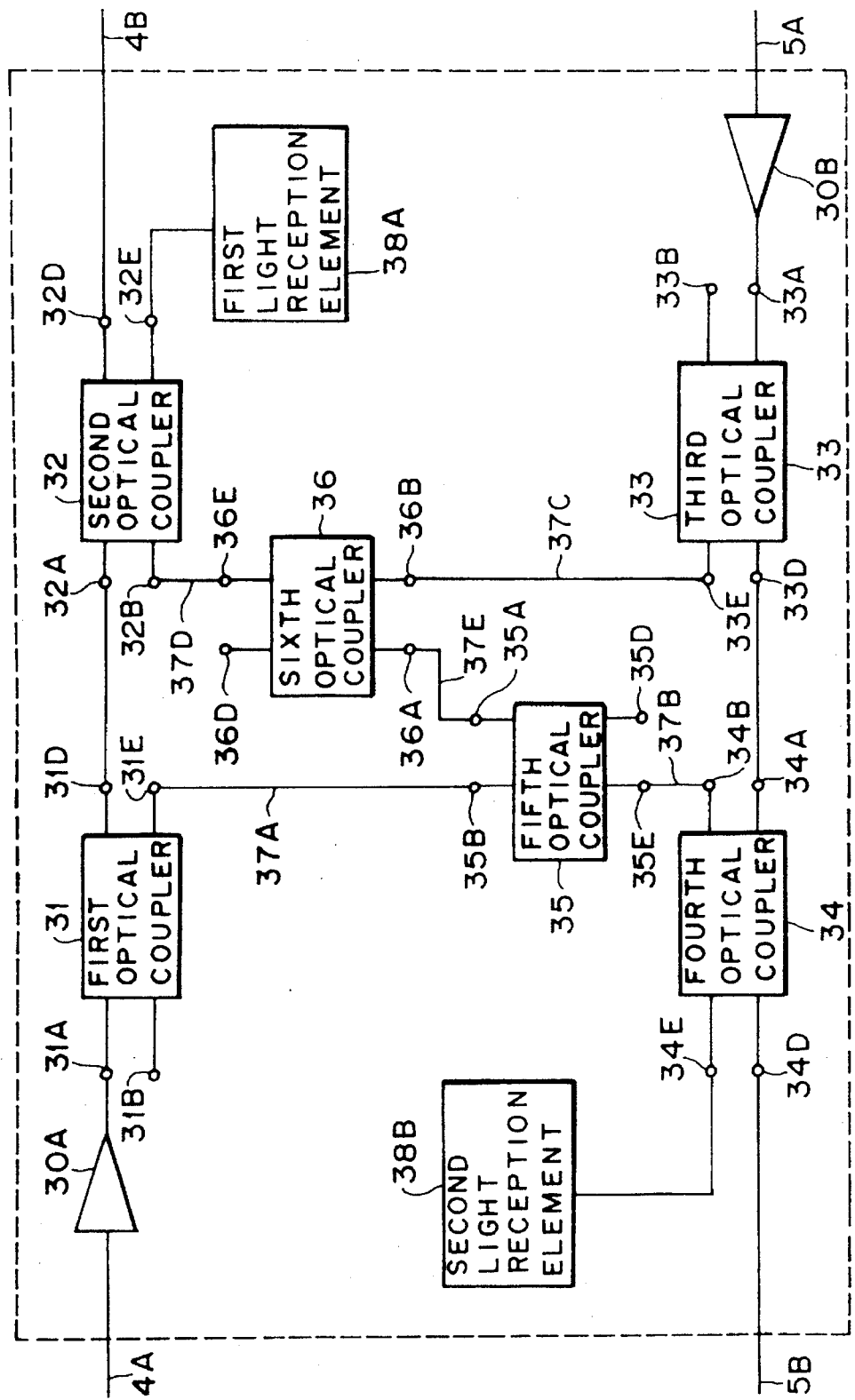
FIG. 6 is a view showing an improved construction of the second embodiment of the present invention.

Subsequently, an improved construction of the second embodiment will be described with reference to FIG. 6. It is to be noted that substantially same components to those of FIG. 1 are denoted by same reference characters and description of them is omitted herein. Further, since the ascending optical amplifier 30A and the descending optical amplifier 30B have same constructions to those of the ascending optical amplifier 20A and the descending optical amplifier 20B described hereinabove with reference to FIG. 4 in the first embodiment, also description thereof is omitted herein.

A first light reception element 38A is connected to the second output port 32E of the second optical coupler 32, and a second light reception element 38B is connected to the second output port 34E of the fourth optical coupler 34. The output of the first light reception element 38A is sent to first output fixing control means (means same to the first output fixing control means 29A of FIG. 4), and the inrush current to the pumping light source 27B of the ascending optical amplifier 30A is controlled in response to the output of the first light reception element 38A by the first output fixing control means 29A. This control is performed so that the intensity of light to be incident to the first light reception element 38A may always be fixed. Meanwhile, the output of the second light reception element 38B is sent to second output fixing control means (means same to the second output fixing control means 29B of FIG. 4), and the inrush current to the pumping light source 27B of the descending optical amplifier 30B is controlled in response to the output of the second light reception element 38B by the second output fixing control means 29B. This control is performed so that the intensity of light to be incident to the second light reception element 38B may always be fixed.

Since the power of output light of the ascending or descending optical amplifier 30A or 30B is controlled in response to the amount of light of the first or second light reception element 38A or 38B in this manner, the signal light outputted from the optical amplifier repeater is always stable, and communication with a high degree of reliability can be realized.

It is to be noted that, in the present construction, the branching ratios of the first to fourth optical couplers 31, 32, 33 and 34 are set in the following manner. The branching ratios of the third optical coupler 33 and the second optical coupler 32 are set such that a value obtained by dividing the power of light outputted from the first output port 33D of the third optical coupler 33 in response to input light from the first input port 33A of the third optical coupler 33 by the power of light outputted from the second output port 33E of the third optical coupler 33 in response to the input light from the first input port 33A of the third optical coupler 33 may be higher than another value obtained by dividing the power of light outputted from the first output port 32D of the second optical coupler 32 in response to input light from the first input port 32A of the second optical coupler 32 by the power of light outputted from the second output port 32E of the second optical coupler 32 in response to the light from the first input port 32A of the second optical coupler 32. In particular, where the power of light inputted from the first input port 33A of the third optical coupler 33 is represented by "1"; the power of light outputted from the first output port 33D of the third optical coupler 33 by "c"; the power of light outputted from the second output port 33E of the third optical coupler 33 by "1-c"; the power of light inputted from the first input port 32A of the second optical coupler 32 by "1"; the power of light outputted from the first output port 32D of the second optical coupler 32 by "b"; and the power of light outputted from the second output port 32E of the second optical coupler 32 by "1-b", the branching ratios of the third optical coupler 33 and the second optical coupler 32 are set so as to satisfy $$c/(1-c) \geq b/(1-b)$$

Meanwhile, the branching ratios of the first optical coupler 31 and the fourth optical coupler 34 are set such that a value obtained by dividing the power of light outputted from the first output port 31D of the first optical coupler 31 in response to input light from the first input port 31A of the first optical coupler 31 by the power of light outputted from the second output port 31E of the first optical coupler 31 in response to the input light from the first input port 31A of the first optical coupler 31 may be higher than another value obtained by dividing the power of light outputted from the first output port 34D of the fourth optical coupler 34 in response to input light from the first input port 34A of the fourth optical coupler 34 by the power of light outputted from the second output port 34E of the fourth optical coupler 34 in response to the light from the first input port 34A of the fourth optical coupler 34. In particular, where the power of light inputted from the first input port 31A of the first optical coupler 31 is represented by "1"; the power of light outputted from the first output port 31D of the first optical coupler 31 by "a"; the power of light outputted from the second output port 31E of the first optical coupler 31 by "1-a"; the power of light inputted from the first input port 34A of the fourth optical coupler 34 by "1"; the power of light outputted from the first output port 34D of the fourth optical coupler 34 by "d"; and the power of light outputted from the second output port 34E of the fourth optical coupler 34 by "1-d", the branching ratios of the first optical coupler 31 and the fourth optical coupler 34 are set so as to satisfy $$a/(1-a) > d/(1-d)$$

The reason why the branching ratios are set in such a manner as described is such as follows. Both of light sent from the ascending optical amplifier 30A by way of the first optical coupler 31 and the second optical coupler 32 and light sent from the descending optical amplifier 30B by way of the third optical coupler 33, the sixth optical coupler 36 and the second optical coupler 32 are inputted to the first light reception element 38A. However, for the control of the ascending optical amplifier 30A, only the light from the former is important, and the light from the latter is mere noise. Accordingly, the reason is that the detection sensitivity of the first light reception element 38A can be improved by making the power of light from the former sufficiently higher than the power of light from the latter. This similarly applies to the second light reception element 38B.

(3) Third Embodiment

Figure 7:
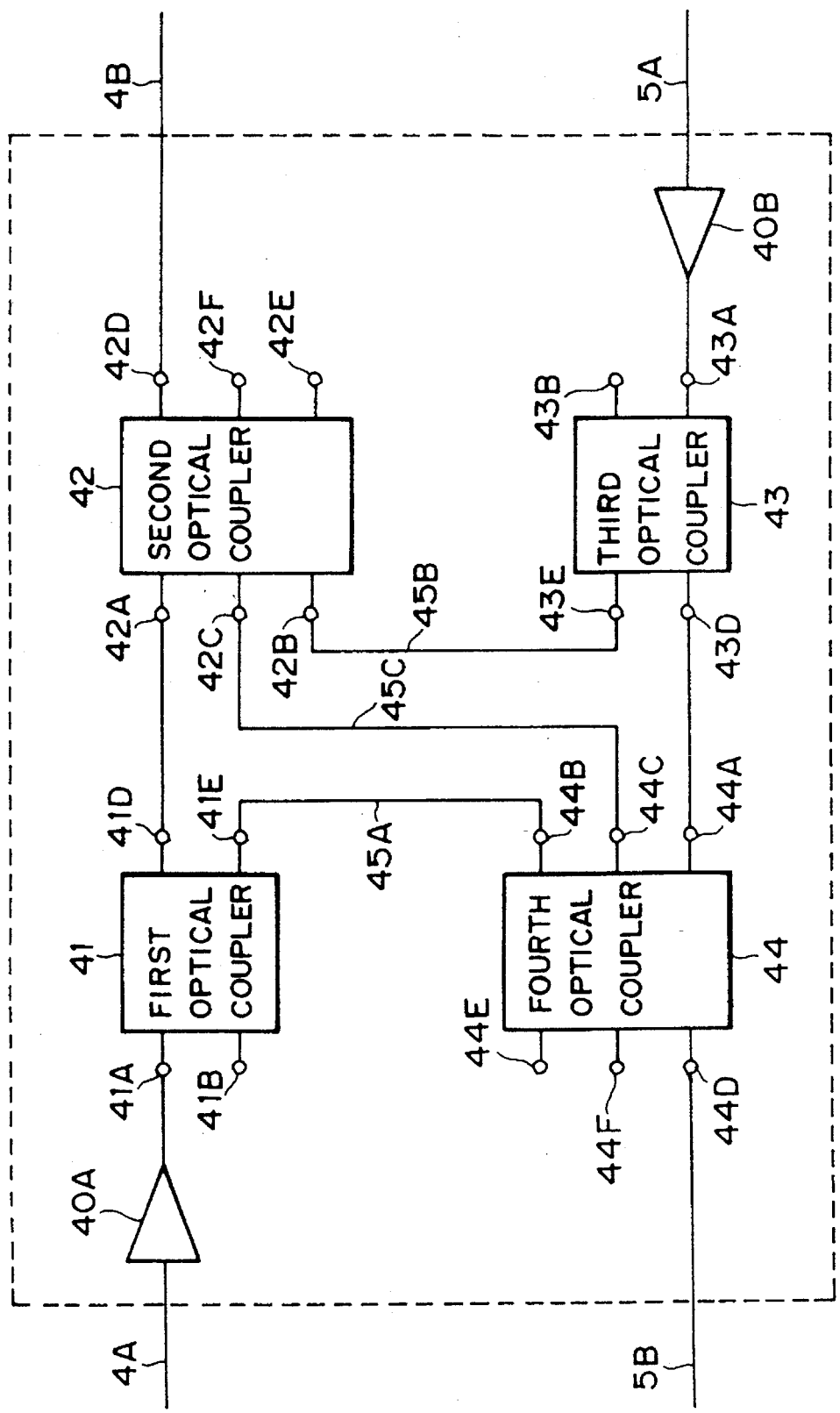
FIG. 7 is a view showing a basic construction of a third embodiment of the present invention.
Figure 8:
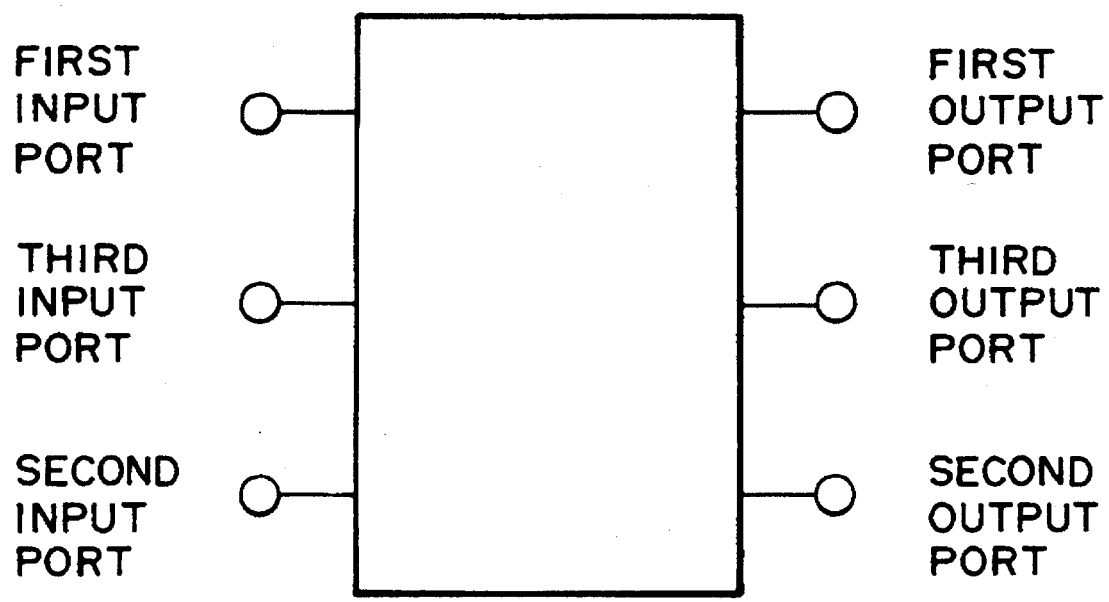
FIG. 8 is a view showing a construction of a three-input three-output optical coupler.

FIG. 7 is a view showing a basic construction of the third embodiment of the present invention. The optical amplifier repeater shown includes an ascending optical amplifier 40A, a descending optical amplifier 40B, a first optical coupler 41, a second optical coupler 42, a third optical coupler 43 and a fourth optical coupler 44. Each of the first and third optical couplers 41 and 43 is a two-input two-output optical coupler having, as shown in FIG. 2, a first input port, a second input port, a first output port and a second output port. Further, each of the first and third optical couplers 41 and 43 is a directional optical coupler which only functions from the input side toward the output side thereof. It is to be noted that each of the first and third optical couplers 41 and 43 may be a bidirectional optical coupler which functions from the input side toward the output side thereof and from the output side toward the input side thereof. Meanwhile, each of the second and fourth optical couplers 42 and 44 is a three-input three-output optical coupler having, as shown in FIG. 8, a first input port, a second input port, a third input port, a first output port, a second output port and a third output port. Further, each of the second and fourth optical couplers 42 and 44 is a bidirectional optical coupler which functions from the input side toward the output side thereof and from the output side toward the input side thereof.

The input side of the ascending optical amplifier 40A is connected to an input side 4A of an ascending line, and the output side of the ascending optical amplifier 40A is connected to the first input port 41A of the first optical coupler 41. The first output port 41D of the first optical coupler 41 is connected to the first input port 42A of the second optical coupler 42, and the first output port 42D of the second optical coupler 42 is connected to an output side 4B of the ascending line. The input side of the descending optical amplifier 40B is connected to an input side 5A of a descending line, and the output side of the descending optical amplifier 40B is connected to the first input port 43A of the third optical coupler 43. The first output port 43D of the third optical coupler 43 is connected to the first input port 44A of the fourth optical coupler 44, and the first output port 44D of the fourth optical coupler 44 is connected to an output side 5B of the descending line.

The second output port 41E of the first optical coupler 41 is connected to the second input port 44B of the fourth optical coupler 44 by a first optical transmission line 45A. The second output port 43E of the third optical coupler 43 is connected to the second input port 42B of the second optical coupler 42 by a second optical transmission line 45B. The third input port 42C of the second optical coupler 42 is connected to the third input port 44C of the fourth optical coupler 44 by a third optical transmission line 45C.

The second input port 41B of the first optical coupler 41, the second output port 42E of the second optical coupler 42, the third output port 42F of the second optical coupler 42, the second input port 43B of the third optical coupler 43, the second output port 44E of the fourth optical coupler 44 and the third output port 44F of the fourth optical coupler 44 are each processed by non-reflecting termination processing so as to prevent deterioration in light transmission characteristic by reflected light at the location. The non-reflecting termination processing may be such processing as, for example, to form an end face of an optical fiber constituting the port as a face inclined by about 8 degrees with reference to a plane perpendicular to an axial line of the optical fiber, to wind an optical fiber constituting the port in a plurality of turns or to soak an end of an optical fiber constituting the port in liquid of a predetermined refractive index.

Thus, signal light sent from the input side 4A of the ascending line is amplified by the ascending optical amplifier 40A and sent to the output side 4B of the ascending line by way of the first input port 41A and the first output 41D of the first optical coupler 41 and the first input port 42A and the first output port 42D of the second optical coupler 42. Meanwhile, signal light sent from the input side 5A of the descending line is amplified by the descending optical amplifier 40B and sent to the output side 5B of the descending line by way of the first input port 43A and the first output port 43D of the third optical coupler 43 and the first input port 44A and the first output port 44D of the fourth optical coupler 44.

Part of the signal light inputted to the first optical coupler 41 is outputted from the second output port 41E of the first optical coupler 41 and sent to the output side 5B of the descending line by way of the first optical transmission line 45A and the second input port 44B and the first output port 44D of the fourth optical coupler 44. Further, part of the signal light inputted to the third optical coupler 43 is outputted from the second output port 43E of the third optical coupler 43 and sent to the output side 4B of the ascending line by way of the second optical transmission line 45B and the second input port 42B and the first output port 42D of the second optical coupler 42. In this manner, a loop back path of the ascending line is constituted from the first optical coupler 41, the first optical transmission line 45A and the fourth optical coupler 44. Further, a loop back path of the descending line is constituted from the third optical coupler 43, the second optical transmission line 45B and the second optical coupler 42.

Meanwhile, reflected light from the output side 4B of the ascending line is inputted from the first output port 42D of the second optical coupler 42 and sent to the output side 5B of the descending line by way of the third input port 42C of the second optical coupler 42, the third optical transmission line 45C, and the third input port 44C and the first output port 44D of the fourth optical coupler 44. Further, reflected light from the output side 5B of the descending line is inputted from the first output port 44D of the fourth optical coupler 44 and sent to the output side 4B of the ascending line by way of the third input port 44C of the fourth optical coupler 44, the third optical transmission line 45C, and the third input port 42C and the first output port 42D of the second optical coupler 42. In this manner, a return path of the ascending line is constituted from the second optical coupler 42, the third optical transmission line 45C and the fourth optical coupler 44. Meanwhile, a return path of the descending line is constituted from the fourth optical coupler 44, the third optical transmission line 45C and the second optical coupler 42.

According to the present embodiment, the loop back paths and the return paths of the ascending line and the descending line are constructed without constructing a loop in the optical amplifier repeater. Accordingly, circulation noise will not be superimposed on signal light introduced from the ascending line into the descending line by way of the loop back paths or signal light introduced from the descending line into the ascending line by way of the loop back paths. Meanwhile, circulation noise will not be superimposed on reflected light introduced from the ascending line into the descending line by way of the return paths or reflected light introduced from the descending line into the ascending line by way of the return paths. Accordingly, the signal to noise ratio (SNR) of the signal light or reflected light is improved, and detection of a trouble and specification of a trouble location can be achieved with a high degree of accuracy.

Figure 9:
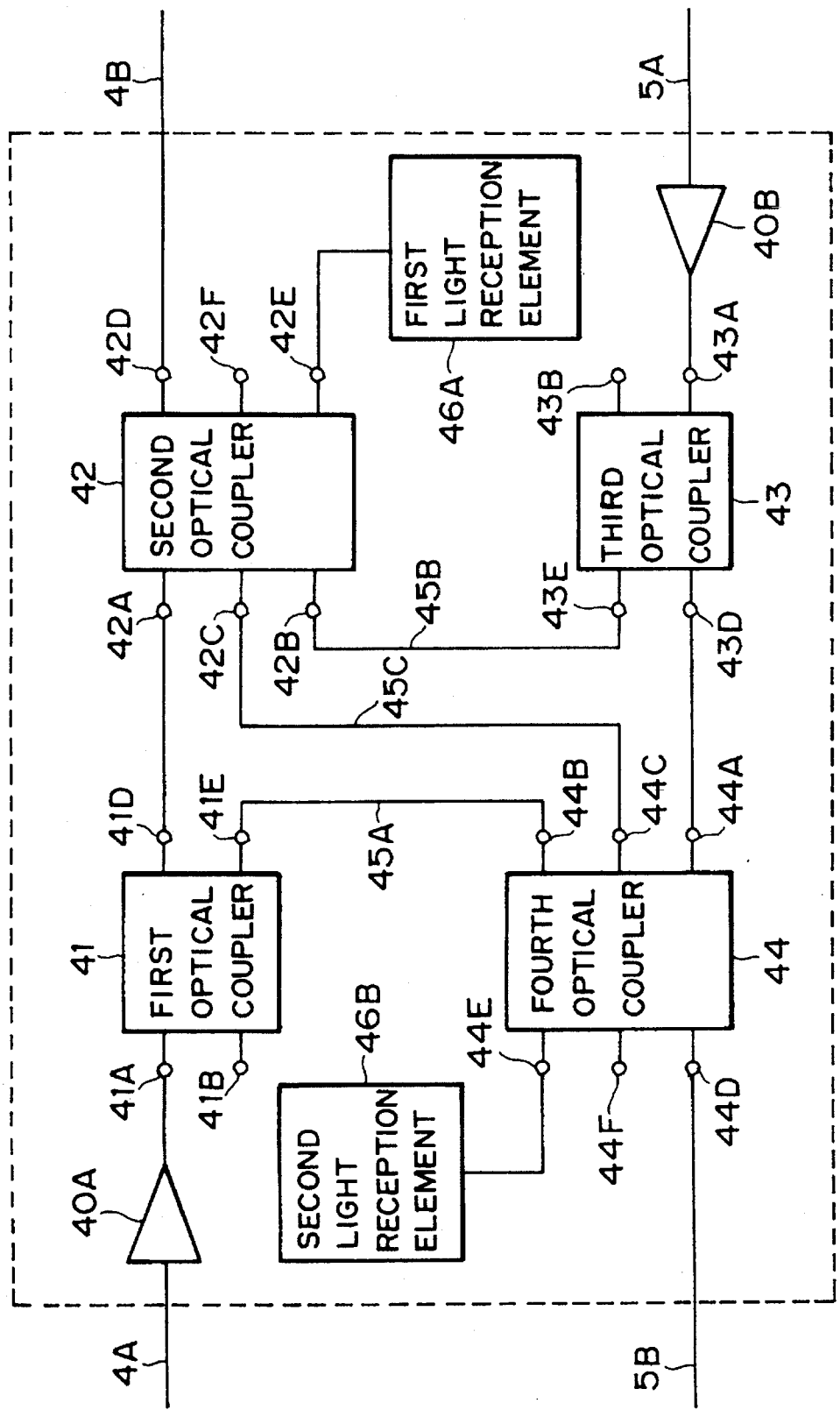
FIG. 9 is a view showing an improved construction of the third embodiment of the present invention.

Subsequently, an improved construction of the third embodiment will be described with reference to FIG. 9. It is to be noted that substantially same components to those of FIG. 7 are denoted by same reference characters and description thereof is omitted herein. Further, since the ascending optical amplifier 40A and the descending optical amplifier 40B have same constructions to those of the ascending optical amplifier 20A and the descending optical amplifier 20B described hereinabove with reference to FIG. 4 in the first embodiment, also description of them is omitted herein.

A first light reception element 46A is connected to the second output port 42E of the second optical coupler 42, and a second light reception element 46B is connected to the second output 44E port of the fourth optical coupler 44. The output of the first light reception element 46A is sent to first output fixing control means (means same to the first output fixing control means 29A of FIG. 4), and the inrush current to the pumping light source 27B of the ascending optical amplifier 40A is controlled in response to the output of the first light reception element 46A by the first output fixing control means. This control is performed so that the intensity of light to be incident to the first light reception element 46A may always be fixed. Meanwhile, the output of the second light reception element 46B is sent to second output fixing control means (means same to the second output fixing control means 29B of FIG. 4), and the inrush current to the pumping light source 27B of the descending optical amplifier 40B is controlled in response to the output of the second light reception element 46B by the second output fixing control means. This control is performed so that the intensity of light to be incident to the second light reception element 46B may always be fixed. Since the power of output light of the ascending or descending optical amplifier 40A or 40B is controlled in response to the amount of light of the first or second light reception element 46A or 46B in this manner, the signal light outputted from the optical amplifier repeater is always stable, and communication with a high degree of reliability can be realized.

It is to be noted that, in the present construction, the branching ratios of the first to fourth optical couplers 41, 42, 43 and 44 are set in the following manner. The branching ratios of the third optical coupler 43 and the second optical coupler 42 are set such that a value obtained by dividing the power of light outputted from the first output port 43D of the third optical coupler 43 in response to input light from the first input port 43A of the third optical coupler 43 by the power of light outputted from the second output port 43E of the third optical coupler 43 in response to the input light from the first input port 43A of the third optical coupler 43 may be higher than another value obtained by dividing the power of light outputted from the first output port 42D of the second optical coupler 42 in response to input light from the first input port 42A of the second optical coupler 42 by the power of light outputted from the second output port 42E of the second optical coupler 42 in response to the light from the first input port 42A of the second optical coupler 42. In particular, where the power of light inputted from the first input port 43A of the third optical coupler 43 is represented by "1"; the power of light outputted from the first output port 43D of the third optical coupler 43 by "c"; the power of light outputted from the second output port 43E of the third optical coupler 43 by "1-c"; the power of light inputted from the first input port 42A of the second optical coupler 42 by "1"; the power of light outputted from the first output port 42D of the second optical coupler 42 by "b"; and the power of light outputted from the second output port 42E of the second optical coupler 42 by "1-b", the branching ratios of the third optical coupler 43 and the second optical coupler 42 are set so as to satisfy $$c/(1-c) > b/(1-b)$$

Meanwhile, the branching ratios of the first optical coupler 41 and the fourth optical coupler 44 are set such that a value obtained by dividing the power of light outputted from the first output port 41D of the first optical coupler 41 in response to input light from the first input port 41A of the first optical coupler 41 by the power of light outputted from the second output port 41E of the first optical coupler 41 in response to the input light from the first input port 41A of the first optical coupler 41 may be higher than another value obtained by dividing the power of light outputted from the first output port 44D of the fourth optical coupler 44 in response to input light from the first input port 44A of the fourth optical coupler 44 by the power of light outputted from the second output port 44E of the fourth optical coupler 44 in response to the light from the first input port 44A of the fourth optical coupler 44. In particular, where the power of light inputted from the first input port 41A of the first optical coupler 41 is represented by "1"; the power of light outputted from the first output port 41D of the first optical coupler 41 by "a"; the power of light outputted from the second output port 41E of the first optical coupler 41 by "1-a"; the power of light inputted from the first input port 44A of the fourth optical coupler 44 by "1"; the power of light outputted from the first output port 44D of the fourth optical coupler 44 by "d"; and the power of light outputted from the second output port 44E of the fourth optical coupler 44 by "1-d", the branching ratios of the first optical coupler 41 and the fourth optical coupler 44 are set so as to satisfy $$a/(1-a) > d/(1-d)$$

The reason why the branching ratios are set in such a manner as described is such as follows. Both of light sent from the ascending optical amplifier 40A by way of the first optical coupler 41 and the second optical coupler 42 and light sent from the descending optical amplifier 40B by way of the third optical coupler 43 and the second optical coupler 42 are inputted to the first light reception element 46A. However, for the control of the ascending optical amplifier 40A, only the light from the former is important, and the light from the latter is mere noise. Accordingly, the reason is that the detection sensitivity of the first light reception element 46A can be improved by making the power of light from the former sufficiently higher than the power of light from the latter. This similarly applies to the second light reception element 46B.

(4) Fourth Embodiment

Figure 10:
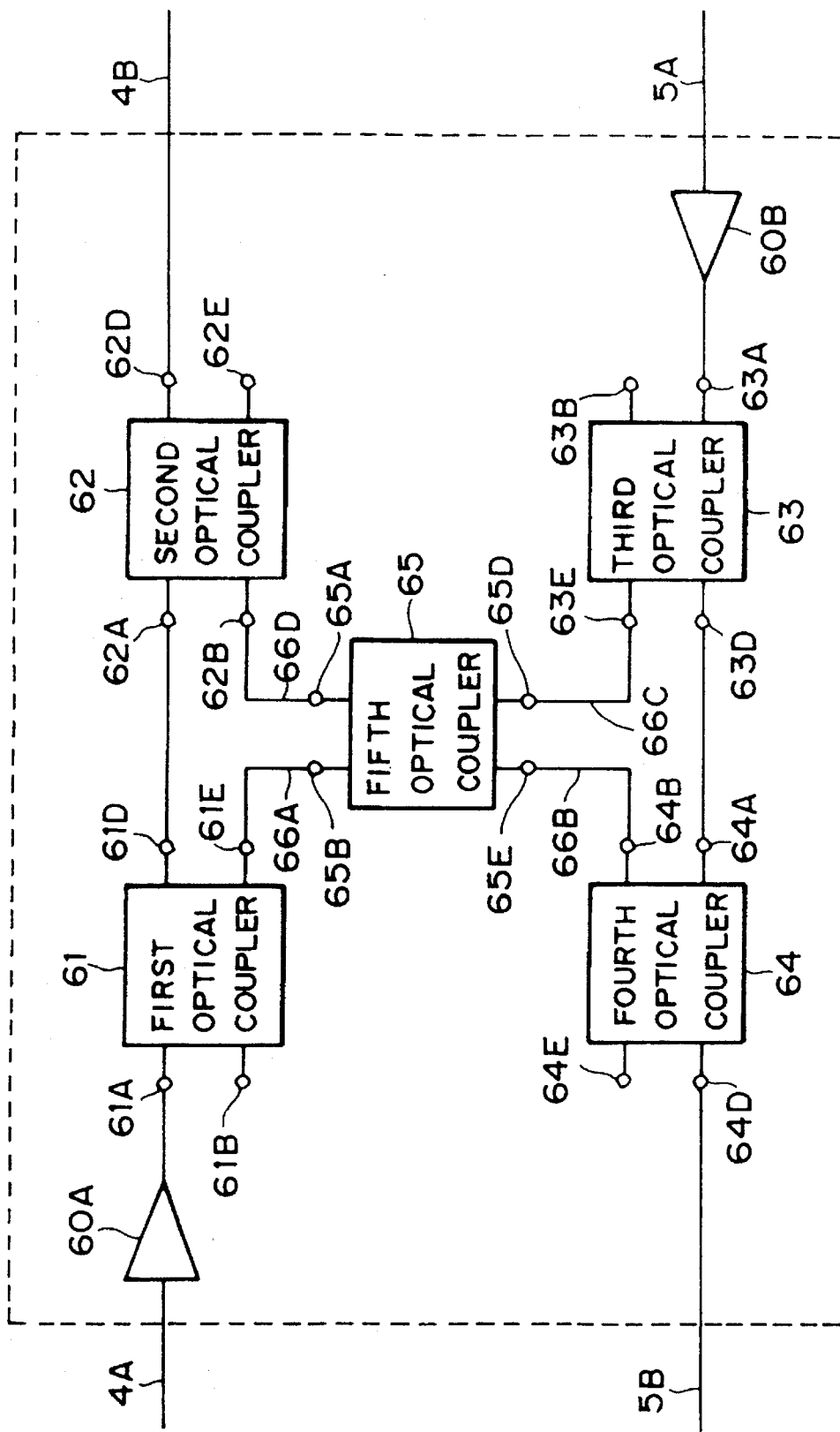
FIG. 10 is a view showing a basic construction of a fourth embodiment of the present invention.

FIG. 10 is a view showing a basic construction of the fourth embodiment of the present invention. The optical amplifier repeater shown includes an ascending optical amplifier 60A, a descending optical amplifier 60B, a first optical coupler 61, a second optical coupler 62, a third optical coupler 63, a fourth optical coupler 64 and a fifth optical coupler 65. Each of the first to fifth optical couplers 61, 62, 63, 64 and 65 is a two-input two-output optical coupler having, as shown in FIG. 2, a first input port, a second input port, a first output port and a second output port. Further, each of the first and third optical couplers 61 and 63 is a directional optical coupler which only functions from the input side toward the output side thereof. It is to be noted that each of the first and third optical couplers 61 and 63 may be a bidirectional optical coupler which functions from the input side toward the output side thereof and from the output side toward the input side thereof. Meanwhile, each of the second, fourth and fifth optical couplers 62, 64 and 65 is a bidirectional optical coupler which functions from the input side toward the output side thereof and from the output side toward the input side thereof.

The input side of the ascending optical amplifier 60A is connected to an input side 4A of an ascending line, and the output side of the ascending optical amplifier 60A is connected to the first input port 61A of the first optical coupler 61. The first output port 61D of the first optical coupler 61 is connected to the first input port 62A of the second optical coupler 62, and the first output port 62D of the second optical coupler 62 is connected to an output side 4B of the ascending line. The input side of the descending optical amplifier 60B is connected to an input side 5A of a descending line, and the output side of the descending optical amplifier 60B is connected to the first input port 63A of the third optical coupler 63. The first output port 63D of the third optical coupler 63 is connected to the first input port 64A of the fourth optical coupler 64, and the first output port 64D of the fourth optical coupler 64 is connected to an output side 5B of the descending line.

The second input port 65B of the fifth optical coupler 65 is connected to the second output port 61E of the first optical coupler 61 by way of a first optical transmission line 66A, and the second output port 65E of the fifth optical coupler 65 is connected to the second input port 64B of the fourth optical coupler 64 by way of a second optical transmission line 66B. The first output port 65D of the fifth optical coupler 65 is connected to the second output port 63E of the third optical coupler 63 by way of a third optical transmission line 66C, and the first input port 65A of the fifth optical coupler 65 is connected to the second input port 62B of the second optical coupler 62 by way of a fourth optical transmission line 66D.

The second input port 61B of the first optical coupler 61, the second output port 62E of the second optical coupler 62, the second input port 63B of the third optical coupler 63 and the second output port 64E of the fourth optical coupler 64 are each processed by non-reflecting termination processing so as to prevent deterioration in light transmission characteristic by reflected light at the location. The non-reflecting termination processing may be such processing as, for example, to form an end face of an optical fiber constituting the port as a face inclined by about 8 degrees with reference to a plane perpendicular to an axial line of the optical fiber, to wind an optical fiber constituting the port in a plurality of turns or to soak an end of an optical fiber constituting the port in liquid of a predetermined refractive index.

Thus, signal light sent from the input side 4A of the ascending line is amplified by the ascending optical amplifier 60A and sent to the output side 4B of the ascending line by way of the first input port 61A and the first output port 61D of the first optical coupler 61 and the first input port 62A and the first output port 62D of the second optical coupler 62. Meanwhile, signal light sent from the input side 5A of the descending line is amplified by the descending optical amplifier 60B and sent to the output side 5B of the descending line by way of the first input port 63A and the first output port 63D of the third optical coupler 63 and the first input port 64A and the first output port 64D of the fourth optical coupler 64.

Part of the signal light inputted to the first optical coupler 61 is outputted from the second output port 61E of the first optical coupler 61 and sent to the output side 5B of the descending line by way of the first optical transmission line 66A, the second input port 65B and the second output port 65E of the fifth optical coupler 65, the second optical transmission line 66B, and the second input port 64B and the first output port 64D of the fourth optical coupler 64. Part of the signal light inputted to the third optical coupler 63 is outputted from the second output port 63E of the third optical coupler 63 and sent to the output side 4B of the ascending line by way of the third optical transmission line 66C, the first output port 65D and the first input port 65A of the fifth optical coupler 65, the fourth optical transmission line 66D, and the second input port 62B and the first output port 62D of the second optical coupler 62.

In this manner, a loop back path of the ascending line is constituted from the first optical coupler 61, the first optical transmission line 66A, the fifth optical coupler 65, the second optical transmission line 66B and the fourth optical coupler 64. A loop back path of the descending line is constituted from the third optical coupler 63, the third optical transmission line 66C, the fifth optical coupler 65, the fourth optical transmission line 66D and the second optical coupler 62.

Meanwhile, reflected light from the output side 4B of the ascending line is inputted from the first output port 62D of the second optical coupler 62 and sent to the output side 5B of the descending line by way of the second input port 62B of the second optical coupler 62, the fourth optical transmission line 66D, the first input port 65A and the second output port 65E of the fifth optical coupler 65, the second optical transmission line 66B, and the second input port 64B and the first output port 64D of the fourth optical coupler 64. Further, reflected light from the output side 5B of the descending line is inputted from the first output port 64D of the fourth optical coupler 64 and sent to the output side 4B of the ascending line by way of the second input port 64B of the fourth optical coupler 64, the second optical transmission line 66B, the second output port 65E and the first input port 65A of the fifth optical coupler 65, the fourth optical transmission line 66D, and the second input port 62B and the first output port 62D of the second optical coupler 62.

In this manner, a return path of the ascending line is constituted from the second optical coupler 62, the fourth optical transmission line 66D, the fifth optical coupler 65, the second optical transmission line 66B and the fourth optical coupler 64. A return path of the descending line is constituted from the fourth optical coupler 64, the second optical transmission line 66B, the fifth optical coupler 65, the fourth optical transmission line 66D and the second optical coupler 62.

According to the present embodiment, the loop back paths and the return paths of the ascending line and the descending line are constructed without constructing a loop in the optical amplifier repeater. Accordingly, circulation noise will not be superimposed on signal light introduced from the ascending line into the descending line by way of the loop back paths or signal light introduced from the descending line into the ascending line by way of the loop back paths. Meanwhile, circulation noise will not be superimposed on reflected light introduced from the ascending line into the descending line by way of the return paths or reflected light introduced from the descending line into the ascending line by way of the return paths. Accordingly, the signal to noise ratio (SNR) of the signal light or reflected light is improved, and detection of a trouble and specification of a trouble location can be achieved with a high degree of accuracy. Further, the number of optical couplers can be reduced and the cost can be reduced comparing with the second embodiment described above.

Figure 11:
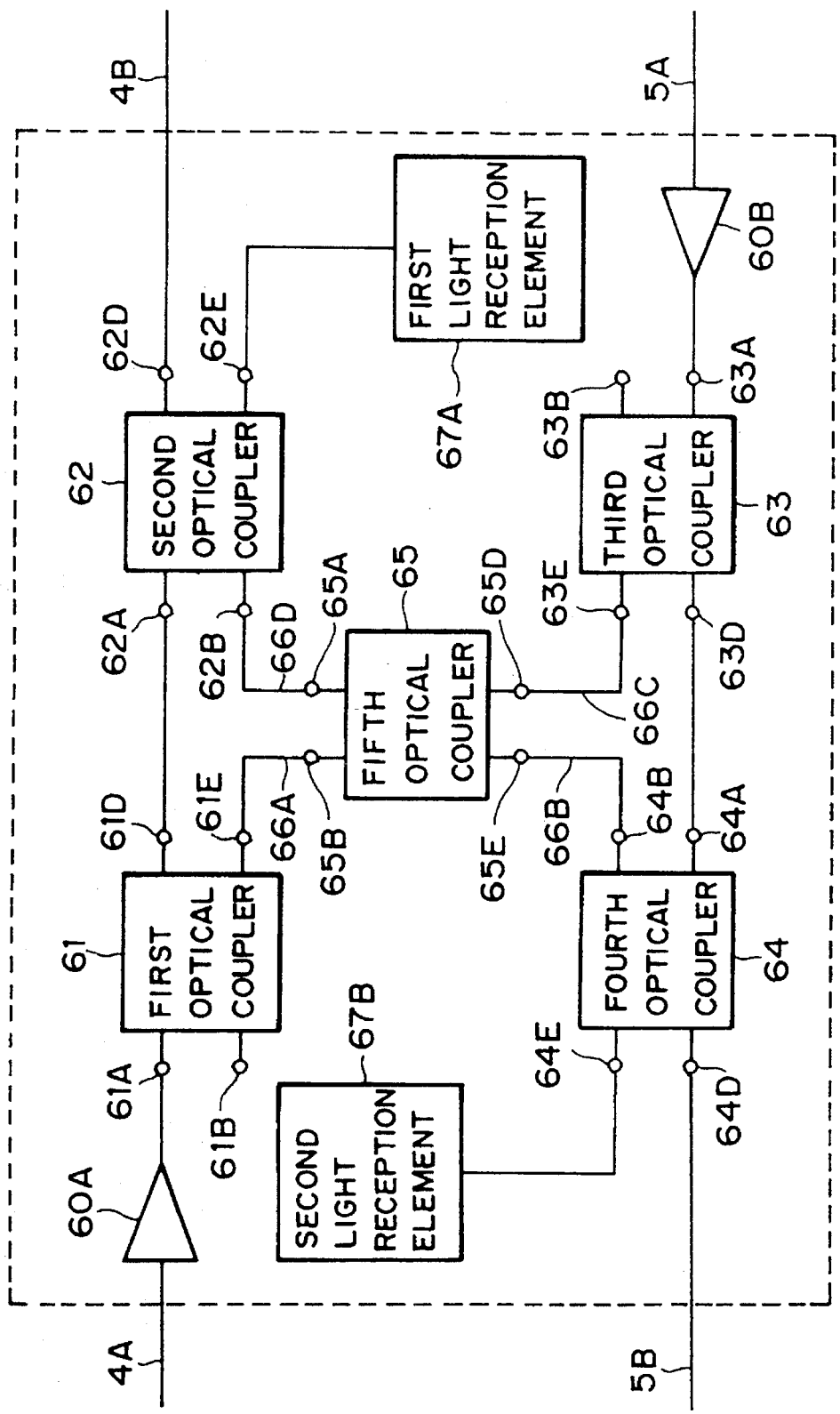
FIG. 11 is a view showing an improved construction of the fourth embodiment of the present invention.

Subsequently, an improved construction of the fourth embodiment will be described with reference to FIG. 11. It is to be noted that substantially same components to those of FIG. 10 are denoted by same reference characters and description of them is omitted herein. Further, since the ascending optical amplifier 60A and the descending optical amplifier 60B have same constructions to those of the ascending optical amplifier 20A and the descending optical amplifier 20B described hereinabove with reference to FIG. 4 in the first embodiment, also description of them is omitted herein.

A first light reception element 67A is connected to the second output port 62E of the second optical coupler 62, and a second light reception element 67B is connected to the second output port 64E of the fourth optical coupler 64. The output of the first light reception element 67A is sent to first output fixing control means (means same to the first output fixing control means 29A of FIG. 4), and the inrush current to the pumping light source 27B of the ascending optical amplifier 60A is controlled in response to the output of the first light reception element 67A by the first output fixing control means. This control is performed so that the intensity of light to be incident to the first light reception element 67A may always be fixed. Meanwhile, the output of the second light reception element 67B is sent to second output fixing control means (means same to the second output fixing control means 29B of FIG. 4), and the inrush current to the pumping light source 27B of the descending optical amplifier 60B is controlled in response to the output of the second light reception element 67B by the second output fixing control means. This control is performed so that the intensity of light to be incident to the second light reception element 67B may always be fixed.

Since the power of output light of the ascending or descending optical amplifier 60A or 60B is controlled in response to the amount of light of the first or second light reception element 67A or 67B in this manner, the signal light outputted from the optical amplifier repeater is always stable, and communication with a high degree of reliability can be realized.

It is to be noted that, in the present construction, the branching ratios of the first to fourth optical couplers 61, 62, 63 and 64 are set in the following manner. The branching ratios of the third optical coupler 63 and the second optical coupler 62 are set such that a value obtained by dividing the power of light outputted from the first output port 63D of the third optical coupler 63 in response to input light from the first input port 63A of the third optical coupler 63 by the power of light outputted from the second output port 63E of the third optical coupler 63 in response to the input light from the first input port 63A of the third optical coupler 63 may be higher than another value obtained by dividing the power of light outputted from the first output port 62D of the second optical coupler 62 in response to input light from the first input 62A port of the second optical coupler 62 by the power of light outputted from the second output port 62E of the second optical coupler 62 in response to the light from the first input port 62A of the second optical coupler 62. In particular, where the power of light inputted from the first input port 63A of the third optical coupler 63 is represented by "1"; the power of light outputted from the first output port 63D of the third optical coupler 63 by "c"; the power of light outputted from the second output port 63E of the third optical coupler 63 by "1-c"; the power of light inputted from the first input port 62A of the second optical coupler 62 by "1"; the power of light outputted from the first output port 62D of the second optical coupler 62 by "b"; and the power of light outputted from the second output port 62E of the second optical coupler 62 by "1-b", the branching ratios of the third optical coupler 63 and the second optical coupler 62 are set so as to satisfy $$c/(1-c) > b/(1-b)$$

Meanwhile, the branching ratios of the first optical coupler 61 and the fourth optical coupler 64 are set such that a value obtained by dividing the power of light outputted from the first output port 61D of the first optical coupler 61 in response to input light from the first input port 61A of the first optical coupler 61 by the power of light outputted from the second output port 61E of the first optical coupler 61 in response to the input light from the first input port 61A of the first optical coupler 61 may be higher than another value obtained by dividing the power of light outputted from the first output port 64D of the fourth optical coupler 64 in response to input light from the first input port 64A of the fourth optical coupler 64 by the power of light outputted from the second output port 64E of the fourth optical coupler 64 in response to the light from the first input port 64A of the fourth optical coupler 64. In particular, where the power of light inputted from the first input port 61A of the first optical coupler 61 is represented by "1"; the power of light outputted from the first output port 61D of the first optical coupler 61 by "a"; the power of light outputted from the second output port 61E of the first optical coupler 61 by "1-a"; the power of light inputted from the first input port 64A of the fourth optical coupler 64 by "1"; the power of light outputted from the first output port 64D of the fourth optical coupler 64 by "d"; and the power of light outputted from the second output port 64E of the fourth optical coupler 64 by "1-d", the branching ratios of the first optical coupler 61 and the fourth optical coupler 64 are set so as to satisfy $$a/(1-a) > d/(1-d)$$

The reason why the branching ratios are set in such a manner as described is such as follows. Both of light sent from the ascending optical amplifier 60A by way of the first optical coupler 61 and the second optical coupler 62 and light sent from the descending optical amplifier 60B by way of the third optical coupler 63, the fifth optical coupler 65 and the second optical coupler 62 are inputted to the first light reception element 67A. However, for the control of the ascending optical amplifier 60A, only the light from the former is important, and the light from the latter is mere noise. Accordingly, the reason is that the detection sensitivity of the first light reception element 67A can be improved by making the power of light from the former sufficiently higher than the power of light from the latter. This similarly applies to the second light reception element 67B.

(5) Fifth Embodiment

Figure 12:
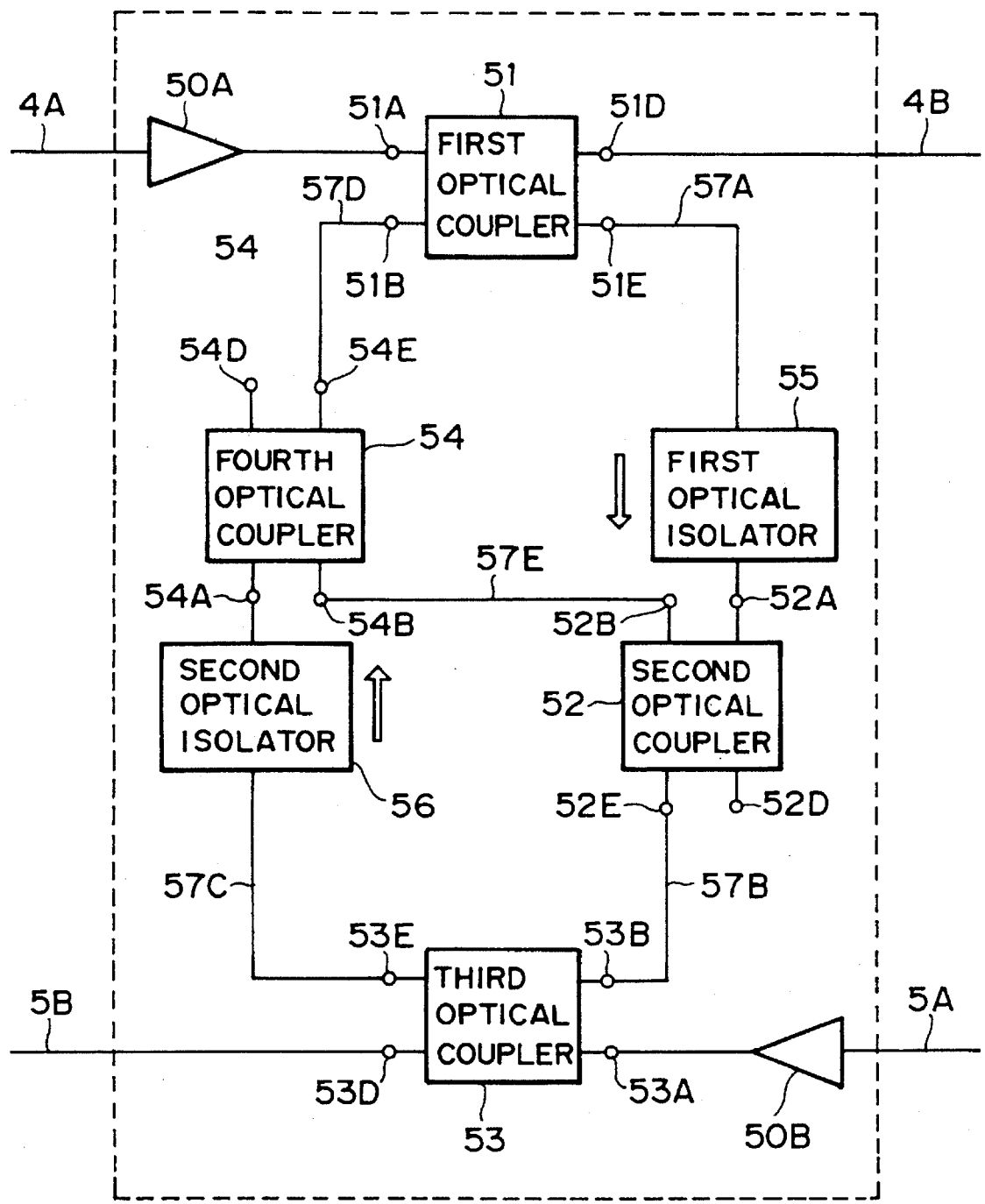
FIG. 12 is a view showing a construction of a fifth embodiment of the present invention.
Figure 13:
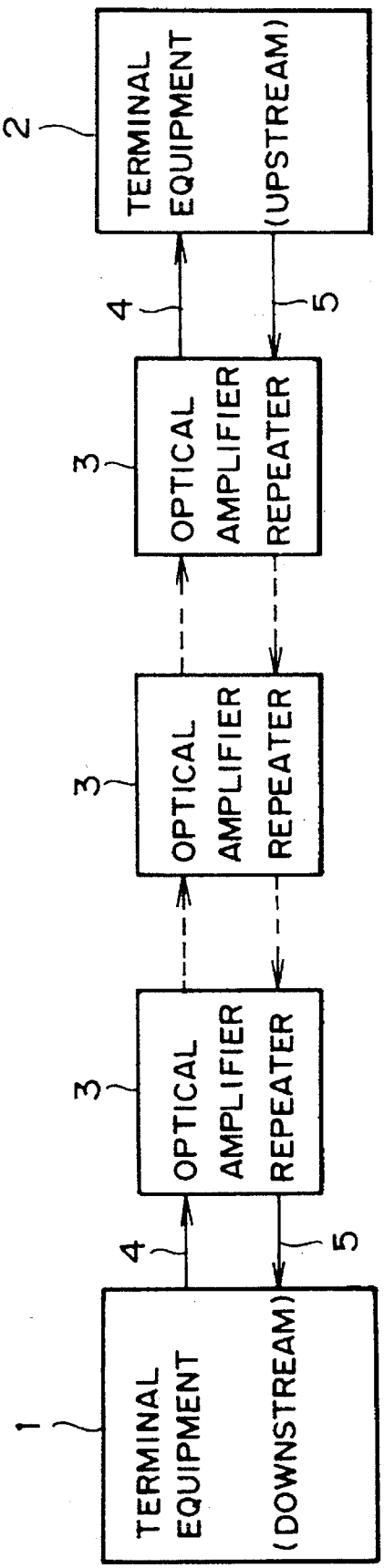
FIG. 13 is a view showing a construction of an optical amplification multi-stage repeating system.
Figure 14:
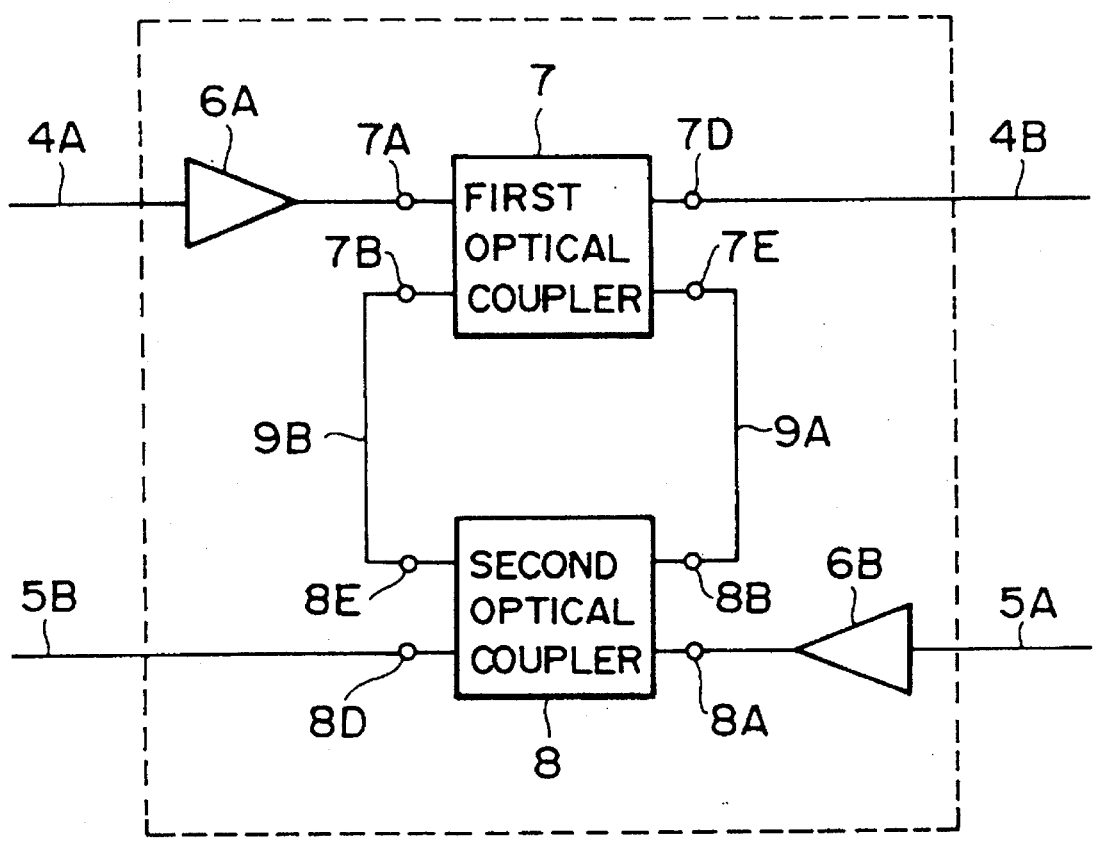
FIG. 14 is a view showing a construction of the prior art.

FIG. 12 is a view showing a construction of the fifth embodiment of the present invention. The optical amplifier repeater shown includes an ascending optical amplifier 50A, a descending optical amplifier 50B, a first optical coupler 51, a second optical coupler 52, a third optical coupler 53 and a fourth optical coupler 54. The optical amplifier repeater further includes a first optical isolator 55 and a second optical isolator 56. Each of the first to fourth optical couplers 51, 52, 53 and 54 is a two-input two-output optical coupler having, as shown in FIG. 2, a first input port, a second input port, a first output port and a second output port. Further, each of the first to fourth optical couplers 51, 52, 53 and 54 is a bidirectional optical coupler which functions from the input side toward the output side thereof and from the output side toward the input side thereof.

The input side of the ascending optical amplifier 50A is connected to an input side 4A of an ascending line, and the output side of the ascending optical amplifier 50A is connected to the first input port 51A of the first optical coupler 51. The first output port 51D of the first optical coupler 51 is connected to an output side 4B of the ascending line. The input side of the descending optical amplifier 50B is connected to an input side 5A of a descending line, and the output side of the descending optical amplifier 50B is connected to the first input port 53A of the third optical coupler 53. The first output port 53D of the third optical coupler 53 is connected to an output side 5B of the descending line.

The first input port 52A of the second optical coupler 52 is connected to the second output port 51E of the first optical coupler 51 by way of a first optical transmission line 57A and the first optical isolator 55. The second output port 52E of the second optical coupler 52 is connected to the second input port 53B of the third optical coupler 53 by way of a second optical transmission line 57B. The first input port 54A of the fourth optical coupler 54 is connected to the second output port 53E of the third optical coupler 53 by way of a third optical transmission line 57C and the second optical isolator 56. The second output port 54E of the fourth optical coupler 54 is connected to the second input port 51B of the first optical coupler 51 by way of a fourth optical transmission line 57D. The second input port 52B of the second optical coupler 52 is connected to the second input port 54B of the fourth optical coupler 54 by way of a fifth optical transmission line 57E.

The first optical isolator 55 is provided so that it passes light therethrough only in a direction from the second output port 51E of the first optical coupler 51 toward the first input port 52A of the second optical coupler 52. Further, the second optical isolator 56 is provided so that it passes light therethrough only in a direction from the second output port 53E of the third optical coupler 53 toward the first input port 54A of the fourth optical coupler 54.

The first output port 52D of the second optical coupler 52 and the first output port 54D of the fourth optical coupler 54 are each processed by non-reflecting termination processing so as to prevent deterioration in light transmission characteristic by reflected light at the location. The non-reflecting termination processing may be such processing as, for example, to form an end face of an optical fiber constituting the port as a face inclined by about 8 degrees with reference to a plane perpendicular to an axial line of the optical fiber, to wind an optical fiber constituting the port in a plurality of turns or to soak an end of an optical fiber constituting the port in liquid of a predetermined refractive index.

Thus, signal light sent from the input side 4A of the ascending line is amplified by the ascending optical amplifier 50A and sent to the output side 4B of the ascending line by way of the first input port 51A and the first output port 51D of the first optical coupler 51. Meanwhile, signal light sent from the input side 5A of the descending line is amplified by the descending optical amplifier 50B and sent to the output side 5B of the descending line by way of the first input port 53A and the first output port 53D of the third optical coupler 53.

Part of the signal light inputted to the first optical coupler 51 is outputted from the second output port 51E of the first optical coupler 51 and sent to the output side 5B of the descending line by way of the first optical transmission line 57A, first optical isolator 55, the first input port 52A and the second output port 52E of the second optical coupler 52, the second optical transmission line 57B, and the second input port 53B and the first output port 53D of the third optical coupler 53. Further, part of the signal light inputted to the third optical coupler 53 is outputted from the second output port 53E of the third optical coupler 53 and sent to the output side 4B of the ascending line by way of the third optical transmission line 57C, second optical isolator 56, the first input port 54A and the second output port 54E of the fourth optical coupler 54, the fourth optical transmission line 57D, and the second input port 51B and the first output port 51D of the first optical coupler 51.

In this manner, a loop back path of the ascending line is constituted from the first optical coupler 51, the first optical transmission line 57A, first optical isolator 55, the second optical coupler 52, the second optical transmission line 57B and the third optical coupler 53. A loop back path of the descending line is constituted from the third optical coupler 53, the third optical transmission line 57C, second optical isolator 56, the fourth optical coupler 54, the fourth optical transmission line 57D and the first optical coupler 51.

Meanwhile, reflected light from the output side 4B of the ascending line is inputted from the first output port 51D of the first optical coupler 51 and sent to the output side 5B of the descending line by way of the second input port 51B of the first optical coupler 51, the fourth optical transmission line 57D, the second output port 54E and the second input port 54B of the fourth optical coupler 54, the fifth optical transmission line 57E, the second input port 52B and the second output port 52E of the second optical coupler 52, the second optical transmission line 57B, and the second input port 53B and the first output port 53D of the third optical coupler 53. Further, reflected light from the output side 5B of the descending line is inputted from the first output port 53D of the third optical coupler 53 and sent to the output side 4B of the ascending line by way of the second input port 53B of the third optical coupler 53, the second optical transmission line 57B, the second output port 52E and the second input port 52B of the second optical coupler 52, the fifth optical transmission line 57E, the second input port 54B and the second output port 54E of the fourth optical coupler 54, the fourth optical transmission line 57D, and the second input port 51B and the first output port 51D of the first optical coupler 51.

In this manner, a return path of the ascending line is constituted from the first optical coupler 51, the fourth optical transmission line 57D, the fourth optical coupler 54, the fifth optical transmission line 57E, the second optical coupler 52, the second optical transmission line 57B and the third optical coupler 53. A return path of the ascending line is constituted from the third optical coupler 53, the second optical transmission line 57B, the second optical coupler 52, the fifth optical transmission line 57E, the fourth optical coupler 54, the fourth optical transmission line 57D and the first optical coupler 51.

Figure 15:
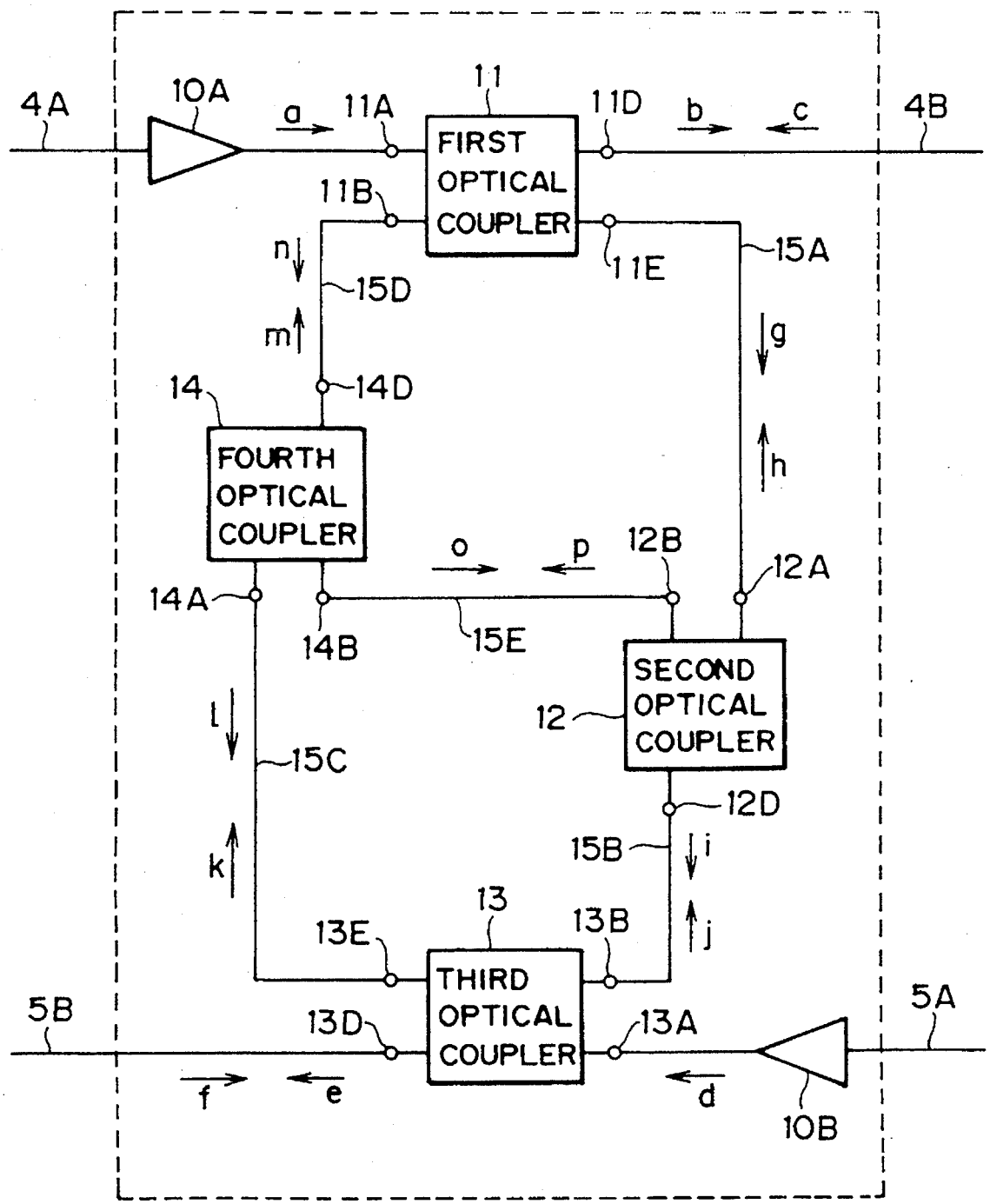
FIG. 15 is a view showing another construction of the prior art.

According to the present embodiment, the first optical isolator 55 for passing light therethrough only in the direction from the first optical coupler 51 toward the second optical coupler 52 is interposed between the first optical coupler 51 and the second optical coupler 52. Meanwhile, the second optical isolator 56 for passing light therethrough only in the direction from the third optical coupler 53 toward the fourth optical coupler 54 is interposed between the third optical coupler 53 and the fourth optical coupler 54. Consequently, since passage of light advancing in the opposite direction is prevented by the first or second optical isolator 55 or 56, the number of light transmission paths constituting loops is reduced comparing with the second conventional optical amplifier repeater shown in FIG. 15 which does not include the first or second optical isolator 55 or 56. In particular, since the path h and the path 1 in FIG. 15 which are not used for a normal loop back path or a normal return path are deleted, the second abnormal return path and the third abnormal return path of the ascending line and the second abnormal return path and the third abnormal return path of the descending line are eliminated. Accordingly, circulation noise will not be superimposed on reflected light introduced from the ascending line into the descending line by way of the return paths or reflected light introduced from the descending line into the ascending line by way of the return paths. Consequently, the signal to noise ratio (SNR) of the reflected light is improved, and specification of a trouble location can be achieved with a high degree of accuracy.

(6) According to the present invention, as described in detail hereinabove, since a plurality of optical coupler means which construct loop back paths and/or return paths and optical transmission lines which interconnect the optical coupler means do not construct any loop or can construct loops but of a reduced number comparing with those of conventional optical amplifier repeaters, superimposition of circulation noise on signal light or reflected light is eliminated or reduced and the signal to noise ratio can be improved remarkably. Accordingly, with an optical amplification multi-stage repeating system in which an optical amplifier repeater to which the present invention is applied is adopted, detection of a trouble and specification of a trouble location can be performed with a high degree of accuracy, and the reliability of the system can be improved. Further, it is also possible to keep the intensity of signal light stable, and the reliability in communication can be improved.

What is claimed is:

1. An optical amplifier repeater for amplifying signal light transmitted along an ascending line and a descending line, comprising:

first optical amplification means for amplifying signal light transmitted along said ascending line;

second optical amplification means for amplifying signal light transmitted along said descending line;

first optical coupler means having a first-first input port, a first-first output port and a first-second output port, an input side of said ascending line being connected to said first-first input port by way of said first optical amplification means;

second optical coupler means having a second-first input port, a second-second input port and a second-first output port, said first-first output port being connected to said second-first input port, an output side of said ascending line being connected to said second-first output port;

third optical coupler means having a third-first input port, a third-first output port and a third-second output port, an input side of said descending line being connected to said third-first input port by way of said second optical amplification means, said second-second input port being connected to said third-second output port; and fourth optical coupler means having a fourth-first input port, a fourth-second input port and a fourth-first output port, said third-first output port being connected to said fourth-first input port, said first-second output port being connected to said fourth-second input port, an output side of said descending line being connected to said fourth-first output port.

2. An optical amplifier repeater according to claim 1, wherein each of said first to fourth optical coupler means has such a directionality that it functions only from an input side to an output side thereof.

3. An optical amplifier repeater according to claim 1, wherein, where each of said first to fourth optical coupler means has an additional input port or output port, said additional input port or output port is processed by non-reflecting termination processing.

4. An optical amplifier repeater according to claim 1, wherein said second optical coupler means further has a second-second output port;

said fourth optical coupler means further has a fourth-second output port; and said optical amplifier repeater further comprises:
        first light reception means connected to said second-second output port;
        second light reception means connected to said fourth-second output port;
        first output fixing control means for controlling a power of output light of said first optical amplification means in response to an intensity of signal light from said first light reception means; and
        second output fixing control means for controlling a power of output light of said second optical amplification means in response to an intensity of signal light from said second light reception means.

5. An optical amplifier repeater according to claim 4, wherein said first optical amplification means includes an ion-doped fiber connected to said input side of said ascending line, a pumping light source for outputting pumping light of an intensity corresponding to an inrush current thereto, and optical wave combining means for introducing the pumping light to said ion-doped fiber;

said second optical amplification means includes an ion-doped fiber connected to said input side of said descending line, a pumping light source for outputting pumping light of an intensity corresponding to an inrush current thereto, and optical wave combining means for introducing the pumping light to said ion-doped fiber;

said first output fixing control means controls the inrush current to said pumping light source so that the intensity of the signal light at said first light reception means may be fixed; and said second output fixing control means controls the inrush current to said pumping light source so that the intensity of the signal light at said second light reception means may be fixed.

6. An optical amplifier repeater according to claim 5, wherein said ion-doped fibers of said first optical amplification means and said second optical amplification means are erbium-doped fibers.

7. An optical amplifier repeater according to claim 4, wherein a value obtained by dividing a power of light outputted from said third-first output port in response to input light from said third-first input port of said third optical coupler means by another power of light outputted from said third-second output port is set higher than another value obtained by dividing a power of light outputted from said second-first output port in response to input light from said second-first input port of said second optical coupler means by another power of light outputted from said second-second output port; and a value obtained by dividing a power of light outputted from said first-first output port in response to input light from said first-first input port of said first optical coupler means by another power of light outputted from said first-second output port is set higher than another value obtained by dividing a power of light outputted from said fourth-first output port in response to input light from said fourth-first input port of said fourth optical coupler means by another power of light outputted from said fourth-second output port.

8. An optical amplifier repeater for amplifying signal light transmitted along an ascending line and a descending line, comprising:

first optical amplification means for amplifying signal light transmitted along said ascending line;

second optical amplification means for amplifying signal light transmitted along said descending line;

first optical coupler means having a first-first input port, a first-first output port and a first-second output port, an input side of said ascending line being connected to said first-first input port by way of said first optical amplification means;

second optical coupler means having a second-first input port, a second-second input port and a second-first output port, said first-first output port being connected to said second-first input port, an output side of said ascending line being connected to said second-first output port;

third optical coupler means having a third-first input port, a third-first output port and a third-second output port, an input side of said descending line being connected to said third-first input port by way of said second optical amplification means;

fourth optical coupler means having a fourth-first input port, a fourth-second input port and a fourth-first output port, said third-first output port being connected to said fourth-first input port, an output side of said descending line being connected to said fourth-first output port;

fifth optical coupler means having a fifth-first input port, a fifth-second input port and a fifth-first output port, said first-second output port being connected to said fifth-second input port, said fourth-second input port being connected to said fifth-first output port; and sixth optical coupler means having a sixth-first input port, a sixth-second input port and a sixth-first output port, said fifth-first input port being connected to said sixth-first input port, said third-second output port being connected to said sixth-second input port, said second-second input port being connected to said sixth-first output port.

9. An optical amplifier repeater according to claim 8, wherein each of said second optical coupler means, said fourth optical coupler means, said fifth optical coupler means and said sixth optical coupler means has such a bidirectionality that it functions from an input side to an output side thereof and from said output side to said input side thereof.

10. An optical amplifier repeater according to claim 8, wherein, where each of said first to sixth optical coupler means has an additional input port or output port, said additional input port or output port is processed by non-reflecting termination processing.

11. An optical amplifier repeater according to claim 8, wherein said second optical coupler means further has a second-second output port;

said fourth optical coupler means further has a fourth-second output port; and said optical amplifier repeater further comprises:
first light reception means connected to said second-second output port;
second light reception means connected to said fourth-second output port;
first output fixing control means for controlling a power of output light of said first optical amplification means in response to an intensity of signal light from said first light reception means; and
second output fixing control means for controlling a power of output light of said second optical amplification means in response to an intensity of signal light from said second light reception means.

12. An optical amplifier repeater according to claim 11, wherein said first optical amplification means includes an ion-doped fiber connected to said input side of said ascending line, a pumping light source for outputting pumping light of an intensity corresponding to an inrush current thereto, and optical wave combining means for introducing the pumping light to said ion-doped fiber;

said second optical amplification means includes an ion-doped fiber connected to said input side of said descending line, a pumping light source for outputting pumping light of an intensity corresponding to an inrush current thereto, and optical wave combining means for introducing the pumping light to said ion-doped fiber;

said first output fixing control means controls the inrush current to said pumping light source so that the intensity of the signal light at said first light reception means may be fixed; and said second output fixing control means controls the inrush current to said pumping light source so that the intensity of the signal light at said second light reception means may be fixed.

13. An optical amplifier repeater according to claim 12, wherein said ion-doped fibers of said first optical amplification means and said second optical amplification means are erbium-doped fibers.

14. An optical amplifier repeater according to claim 11, wherein a value obtained by dividing a power of light outputted from said third-first output port in response to input light from said third-first input port of said third optical coupler means by another power of light outputted from said third-second output port is set higher than another value obtained by dividing a power of light outputted from said second-first output port in response to input light from said second-first input port of said second optical coupler means by another power of light outputted from said second-second output port; and a value obtained by dividing a power of light outputted from said first-first output port in response to input light from said first-first input port of said first optical coupler means by another power of light outputted from said first-second output port is set higher than another value obtained by dividing a power of light outputted from said fourth-first output port in response to input light from said fourth-first input port of said fourth optical coupler means by another power of light outputted from said fourth-second output port.

15. An optical amplifier repeater for amplifying signal light transmitted along an ascending line and a descending line, comprising:

first optical amplification means for amplifying signal light transmitted along said ascending line;

second optical amplification means for amplifying signal light transmitted along said descending line;

first optical coupler means having a first-first input port, a first-first output port and a first-second output port, an input side of said ascending line being connected to said first-first input port by way of said first optical amplification means;

second optical coupler means having a second-first input port, a second-second input port, a second-third input port and a second-first output port, said first-first output port being connected to said second-first input port, an output side of said ascending line being connected to said second-first output port;

third optical coupler means having a third-first input port, a third-first output port and a third-second output port, an input side of said descending line being connected to said third-first input port by way of said second optical amplification means, said second-second input port being connected to said third-second output port; and fourth optical coupler means having a fourth-first input port, a fourth-second input port, a fourth-third input port and a fourth-first output port, said third-first output port being connected to said fourth-first input port, said first-second output port being connected to said fourth-second input port, said second-third input port being connected to said fourth-third input port, an output side of said descending line being connected to said fourth-first output port.

16. An optical amplifier repeater according to claim 15, wherein each of said second and fourth optical coupler means has such a bidirectionality that it functions from an input side to an output side thereof and from said output side to said input side thereof.

17. An optical amplifier repeater according to claim 15, wherein, where each of said first to fourth optical coupler means has an additional input port or output port, said additional input port or output port is processed by non-reflecting termination processing.

18. An optical amplifier repeater according to claim 15, wherein said second optical coupler means further has a second-second output port;

said fourth optical coupler means further has a fourth-second output port; and said optical amplifier repeater further comprises:
first light reception means connected to said second-second output port;
second light reception means connected to said fourth-second output port;

first output fixing control means for controlling a power of output light of said first optical amplification means in response to an intensity of signal light from said first light reception means; and second output fixing control means for controlling a power of output light of said second optical amplification means in response to an intensity of signal light from said second light reception means.

19. An optical amplifier repeater according to claim 18, wherein said first optical amplification means includes an ion-doped fiber connected to said input side of said ascending line, a pumping light source for outputting pumping light of an intensity corresponding to an inrush current thereto, and optical wave combining means for introducing the pumping light to said ion-doped fiber;

said second optical amplification means includes an ion-doped fiber connected to said input side of said descending line, a pumping light source for outputting pumping light of an intensity corresponding to an inrush current thereto, and optical wave combining means for introducing the pumping light to said ion-doped fiber;

said first output fixing control means controls the inrush current to said pumping light source so that the intensity of the signal light at said first light reception means may be fixed; and said second output fixing control means controls the inrush current to said pumping light source so that the intensity of the signal light at said second light reception means may be fixed.

20. An optical amplifier repeater according to claim 19, wherein said ion-doped fibers of said first optical amplification means and said second optical amplification means are erbium-doped fibers.

21. An optical amplifier repeater according to claim 18, wherein a value obtained by dividing a power of light outputted from said third-first output port in response to input light from said third-first input port of said third optical coupler means by another power of light outputted from said third-second output port is set higher than another value obtained by dividing a power of light outputted from said second-first output port in response to input light from said second-first input port of said second optical coupler means by another power of light outputted from said second-second output port; and a value obtained by dividing a power of light outputted from said first-first output port in response to input light from said first-first input port of said first optical coupler means by another power of light outputted from said first-second output port is set higher than another value obtained by dividing a power of light outputted from said fourth-first output port in response to input light from said fourth-first input port of said fourth optical coupler means by another power of light outputted from said fourth-second output port.

22. An optical amplifier repeater for amplifying signal light transmitted along an ascending line and a descending line, comprising:

first optical amplification means for amplifying signal light transmitted along said ascending line;

second optical amplification means for amplifying signal light transmitted along said descending line;

first optical coupler means having a first-first input port, a first-first output port and a first-second output port, an input side of said ascending line being connected to said first-first input port by way of said first optical amplification means;

second optical coupler means having a second-first input port, a second-second input port and a second-first output port, said first-first output port being connected to said second-first input port, an output side of said ascending line being connected to said second-first output port;

third optical coupler means having a third-first input port, a third-first output port and a third-second output port, an input side of said descending line being connected to said third-first input port by way of said second optical amplification means;

fourth optical coupler means having a fourth-first input port, a fourth-second input port and a fourth-first output port, said third-first output port being connected to said fourth-first input port, an output side of said descending line being connected to said fourth-first output port; and fifth optical coupler means having a fifth-first input port, a fifth-second input port, a fifth-first output port and a fifth-second output port, said first-second output port being connected to said fifth-second input port, said fourth-second input port being connected to said fifth-second output port, said third-second output port being connected to said fifth-first output port, said second-second input port being connected to said fifth-first input port.

23. An optical amplifier repeater according to claim 22, wherein each of said second optical coupler means, said fourth optical coupler means and said fifth optical coupler means has such a bidirectionality that it functions from an input side to an output side thereof and from said output side to said input side thereof.

24. An optical amplifier repeater according to claim 22, wherein, where each of said first to fifth optical coupler means has an additional input port or output port, said additional input port or output port is processed by non-reflecting termination processing.

25. An optical amplifier repeater according to claim 22, wherein said second optical coupler means further has a second-second output port;

said fourth optical coupler means further has a fourth-second output port; and said optical amplifier repeater further comprises:
first light reception means connected to said second-second output port;
second light reception means connected to said fourth-second output port;
first output fixing control means for controlling a power of output light of said first optical amplification means in response to an intensity of signal light from said first light reception means; and
second output fixing control means for controlling a power of output light of said second optical amplification means in response to an intensity of signal light from said second light reception means.

26. An optical amplifier repeater according to claim 25, wherein said first optical amplification means includes an ion-doped fiber connected to said input side of said ascending line, a pumping light source for outputting pumping light of an intensity corresponding to an inrush current thereto, and optical wave combining means for introducing the pumping light to said ion-doped fiber;

said second optical amplification means includes an ion-doped fiber connected to said input side of said descending line, a pumping light source for outputting pumping light of an intensity corresponding to an inrush current thereto, and optical wave combining means for introducing the pumping light to said ion-doped fiber;

said first output fixing control means controls the inrush current to said pumping light source so that the intensity of the signal light at said first light reception means may be fixed; and said second output fixing control means controls the inrush current to said pumping light source so that the intensity of the signal light at said second light reception means may be fixed.

27. An optical amplifier repeater according to claim 26, wherein said ion-doped fibers of said first optical amplification means and said second optical amplification means are erbium-doped fibers.

28. An optical amplifier repeater according to claim 25, wherein a value obtained by dividing a power of light outputted from said third-first output port in response to input light from said third-first input port of said third optical coupler means by another power of light outputted from said third-second output port is set higher than another value obtained by dividing a power of light outputted from said second-first output port in response to input light from said second-first input port of said second optical coupler means by another power of light outputted from said second-second output port; and a value obtained by dividing a power of light outputted from said first-first output port in response to input light from said first-first input port of said first optical coupler means by another power of light outputted from said first-second output port is set higher than another value obtained by dividing a power of light outputted from said fourth-first output port in response to input light from said fourth-first input port of said fourth optical coupler means by another power of light outputted from said fourth-second output port.

29. An optical amplifier repeater for amplifying signal light transmitted along an ascending line and a descending line, comprising:

first optical amplification means for amplifying signal light transmitted along said ascending line;

second optical amplification means for amplifying signal light transmitted along said descending line;

first optical isolator means for passing an optical signal only from an input side to an output side therethrough;

second optical isolator means for passing an optical signal only from an input side to an output side therethrough;

first optical coupler means having a first-first input port, a first-second input port, a first-first output port and a first-second output port, an input side of said ascending line being connected to said first-first input port by way of said first optical amplification means, an output side of said ascending line being connected to said first-first output port, the input side of said first optical isolator means being connected to said first-second output port;

second optical coupler means having a second-first input port, a second-second input port and a second-first output port, the output side of said first optical isolator means being connected to said second-first input port;

third optical coupler means having a third-first input port, a third-second input port, a third-first output port and a third-second output port, an input side of said descending line being connected to said third-first first input port by way of said second optical amplification means, said second-first output port being connected to said third-second input port, an output side of said descending line being connected to said third-first output port, the input side of said second optical isolator means being connected to said third-second output port; and fourth optical coupler means having a fourth-first input port, a fourth-second input port and a fourth-first output port, the output side of said second optical isolator means being connected to said fourth-first input port, said second-second input port being connected to said fourth-second input port, said first-second input port being connected to said fourth-first output port.

30. An optical amplifier repeater according to claim 29, wherein each of said first to fourth optical coupler means has such a bidirectionality that it functions from an input side to an output side thereof and from said output side to said input side thereof.

31. An optical amplifier repeater according to claim 29, wherein, where each of said first to fourth optical coupler means has an additional input port or output port, said additional input port or output port is processed by non-reflecting termination processing.

* * * * *